US009652420B2

(12) United States Patent
Ruan et al.

(10) Patent No.: US 9,652,420 B2
(45) Date of Patent: *May 16, 2017

(54) HARDWARE CONTROL INTERFACE FOR IEEE STANDARD 802.11

(71) Applicant: Microsoft Corporation, Redmond, WA (US)

(72) Inventors: Jiandong Ruan, Sammamish, WA (US); Thomas W. Kuehnel, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 720 days.

This patent is subject to a terminal disclaimer.

(21) Appl. No.: 13/720,999

(22) Filed: Dec. 19, 2012

(65) Prior Publication Data

US 2013/0145069 A1    Jun. 6, 2013

Related U.S. Application Data

(63) Continuation of application No. 11/789,939, filed on Jul. 27, 2007, now Pat. No. 8,346,974.

(51) Int. Cl.
  *G06F 15/16* (2006.01)
  *G06F 13/36* (2006.01)
  *H04L 12/861* (2013.01)
(52) U.S. Cl.
  CPC .............. *G06F 13/36* (2013.01); *H04L 49/90* (2013.01)

(58) Field of Classification Search
  CPC .................................. G06F 13/26; H04L 49/90
  See application file for complete search history.

(56) References Cited

U.S. PATENT DOCUMENTS

| 4,649,479 | A | 3/1987 | Advani et al. |
| 5,465,364 | A | 11/1995 | Lathrop et al. |
| 5,872,956 | A | 2/1999 | Beal |
| 5,910,180 | A | 6/1999 | Flory et al. |
| 6,779,185 | B1 * | 8/2004 | Roukbi et al. ............... 719/321 |
| 6,842,611 | B2 | 1/2005 | Beck et al. |
| 6,847,654 | B2 | 1/2005 | Zegelin |
| 6,978,318 | B1 | 12/2005 | Keller |
| 7,010,002 | B2 | 3/2006 | Chow et al. |
| 7,286,551 | B2 | 10/2007 | Park |
| 7,716,379 | B2 | 5/2010 | Ruan |
| 8,032,763 | B2 | 10/2011 | Modica |
| 2002/0122413 | A1 | 9/2002 | Shoemake |
| 2002/0172263 | A1 | 11/2002 | Kindred et al. |
| 2003/0104826 | A1 | 6/2003 | Deng et al. |

(Continued)

FOREIGN PATENT DOCUMENTS

WO    WO 2004/111840 A2    12/2004

OTHER PUBLICATIONS

"IEEE Standard for Local and Metropolitan Area Networks:Overview and Architecture", IEEE, Feb. 7, 2002.

(Continued)

*Primary Examiner* — Larry Donaghue
(74) *Attorney, Agent, or Firm* — L. Alan Collins; Collins & Collins Intellectual, LLC

(57) ABSTRACT

A standardized 802.11 hardware control interface may be provided such that a driver may communicate with any one or more of a variety of network adapters.

20 Claims, 11 Drawing Sheets

(56) References Cited

U.S. PATENT DOCUMENTS

| | | | |
|---|---|---|---|
| 2003/0144029 | A1 | 7/2003 | Wu et al. |
| 2004/0019895 | A1 | 1/2004 | Dubal |
| 2004/0103278 | A1* | 5/2004 | Abhishek et al. ............ 713/160 |
| 2004/0205251 | A1* | 10/2004 | Wiles et al. ................. 709/250 |
| 2005/0147075 | A1 | 7/2005 | Terry |
| 2006/0025075 | A1 | 2/2006 | Chung et al. |
| 2006/0034233 | A1 | 2/2006 | Strutt |
| 2006/0075067 | A1 | 4/2006 | Blackmore |
| 2006/0080679 | A1 | 4/2006 | Parry |
| 2006/0215556 | A1 | 9/2006 | Wu et al. |
| 2006/0224664 | A1 | 10/2006 | Giliberto et al. |
| 2006/0248526 | A1 | 11/2006 | Rostampour |
| 2006/0282518 | A1 | 12/2006 | Karaoguz et al. |
| 2007/0005166 | A1 | 1/2007 | Chen et al. |
| 2007/0076648 | A1 | 4/2007 | Yong |
| 2007/0133707 | A1 | 6/2007 | Hwang |
| 2007/0206503 | A1 | 9/2007 | Gong |
| 2007/0239875 | A1 | 10/2007 | Sood |
| 2008/0044012 | A1 | 2/2008 | Ekberg |
| 2010/0218198 | A1 | 8/2010 | Ruan |

OTHER PUBLICATIONS

"Universal Serial Bus Class Definitions for Communication Devices, Version 1.1", usb.org, Jan. 19, 1999.

"Universal Serial Bus Specification, Revision 2.0", usb.org, Apr. 27, 2000.

"IEEE Standard 802.11-2007" (previously known as "P802.11-REVma"), IEEE, Jun. 12, 2007.

Y. L. Huang et al., "A Multi-Interface Control Infrastructure for Bio-Sensing Devices in Home Care Systems," Proc. of 2005 CACS Automatic Control Conference, Tainan, Taiwan, Nov. 18-19, 2005, 6 pages.

A. Kansal, "A Handoff Protocol for Mobility in Bluetooth Public Access," Master's Thesis Dept. of Electrical Engineering, Indian Institute of Technology Bombay, Powai, Mumbai, Jun. 2002, 80 pages.

The Wireless Directory, "Bluetooth Development, Evaluation, Starter, and Reference Design Kits," May 2007, 8 pages.

Brian P. Crow et al., "IEEE 802.11 Wireless Local Area Networks," IEEE Communications Magazine, Sep. 1997, pp. 116-126.

Alberto Dassatti et al., "High Performance Channel Model Hardware Emulator for 802.11n," IEEE International Conference on Field-Programmable Technology, 2005, pp. 303-304.

Yang Xiao et al., "Performance Analysis and Enhancement for the Current and Future IEEE 802.11 MAC Protocols," Mobile Computing and Communications Review, Apr. 2003, pp. 6-19, vol. 7, No. 2.

U.S. Appl. No. 11/789,939, filed Jul. 27, 2007, Jiandong Ruan.
U.S. Appl. No. 11/789,932, filed Apr. 26, 2007, Jiandong Ruan.
U.S. Appl. No. 12/753,723, filed Apr. 2, 2010, Jiandong Ruan.
Bahl, "MultiNet: Connecting to Multiple IEEE 802.11 Networks Using a Single Wireless Card", Aug. 2003.
U.S. Appl. No. 14/341,689, filed Jul. 25, 2014, Ruan.

* cited by examiner

Transmission Control Information — 20

| Field | Description |
|---|---|
| TxFlags | Bit 0 – Hold Medium Bit<br>Bit 1 – No ACK Bit<br>Bit 2 – Encryption bit.<br>Bit 3 – Preamble Bit<br>Bit 4 – RTS Protection Bit<br>Bit 5 – CTS Protection Bit<br>Bit 6 – Out-of-BSS Bit<br>Bit 7~31 – reserved. |
| TxRates | The TX rate for each (re)-transmission. |
| Reserved | 8-bytes reserved. |
| AIFSN | Bit 0~3: 0 ~ 15 AIFSN value.<br>Bit 4~6 – Transmission Power Level<br>Bit 7 – Reserved |
| CW | CWmin and CWmax that should be used for this packet.<br>Bit0~3 – CWmin<br>Bit4~7 – CWmax |
| BSSPeerIndex | Bit 0 ~ 3 – the index in BSSTable.<br>Bit 4 ~ 15 – the index in PeerTable. |
| Reserved | 8-bytes reserved |

Transmission Status Information — 25

| Field | Description |
|---|---|
| TxFlags | Bit 0 – Failure Bit<br>Bit 1~31– reserved. |
| Retries | Bit 0~2 – Packet Retransmission Count<br>Bit 3~5 – RTS Retransmission Count<br>Bit 6~7 – Reserved |
| TxRate | The data rate at which the packet is successfully transmitted. Applicable when Failure Bit is clear. |
| ACKRxRate | The data rate at which the 802.11 ACK frame is received. This field applies when the packet transmission requires acknowledgement from the receiver and Failure Bit is clear. |
| ACKRSSI | The RSSI of the 802.11 ACK frame. This field applies when the packet transmission requires acknowledgement from the receiver and Failure Bit is clear. |
| ACKNoiseFloor | The Noise Floor of the 802.11 ACK frame. This field applies when the packet transmission requires acknowledgement from the receiver and Failure Bit is clear. |
| Reserved | 23-bytes reserved |

Reception Control Information 30

| field | Description |
|---|---|
| RxFlags | Bit 0 – RxBuffer overflow bit.<br>Bit 1 – FCS Error Bit<br>Bit 2 – Address 1 Matched Bit<br>Bit 3 – Key Unavailable Bit<br>Bit 4 – Decryption Failure Bit<br>Bit 5 – Probe Replied Bit<br>Bit 6 ~ 31 – reserved. |
| RxRate | Data rate at which the packet is received. |
| RSSI | Receive signal strength indicator. |
| Noisefloor | Noise floor in dBm before the first symbol of the packet is decoded. |
| Reserved | Reserved. |
| BandChannel | Identify the channel on which this packet is received. |
| TSF | The local TSF timer value when the packet is received. |

FIG. 4

HARDWARE CONTROL INTERFACE FOR IEEE STANDARD 802.11

BACKGROUND

1. Field of Invention

The techniques described herein relate to wireless network communication, and in particular to a hardware control interface for IEEE standard 802.11.

2. Discussion of Related Art

Computers are sometimes configured to communicate wirelessly with other devices using radio frequency messages that are exchanged in accordance with IEEE standard 802.11. To send and receive wireless messages, software running on a computer communicates with a driver, which is software running on the computer that is specially configured to control a particular wireless network adapter to engage in wireless communication. Wireless network adapters that conform to IEEE standard 802.11 include a radio that transmits and receives radio frequency messages.

SUMMARY

Applicants have developed, a standardized hardware control interface for IEEE standard 802.11 that can be used with any of a variety of different types of 802.11 network adapters and 802.11 software drivers. Previously, a hardware-specific driver needed to be developed for each type of network adapter, including a hardware-specific hardware control interface to control a particular network adapter. By standardizing the hardware control interface for IEEE standard 802.11, the design of software drivers and network adapters may be simplified. Software drivers may be designed such that the information that they exchange with a network adapter conforms to the standardized host control interface. Network adapters may be designed such that the information they exchange with a software driver conforms to the standardize host control interface. As a result, system reliability may be improved.

In some embodiments, hardware control interface may include four "core" interface components, including for example a transmission control interface component, a transmission status interface component, a reception control interface component and a channel switching interface component. However, the invention is not limited in this respect, as in some embodiments different numbers and/or types of interface components may be used.

One embodiment relates to a computer system that includes a processing unit including at least one processor and a driver module that executes on the processing unit. The driver module includes a hardware control interface. The driver module may be configured to at least partially control a network adapter to engage in communication in accordance with IEEE standard 802.11 using the hardware control interface. The hardware control interface may be designed to exchange network adapter independent control information with at least two network adapters of different types.

Another embodiment relates to a computer system comprising a driver module that at least partially controls a network adapter to engage in wireless communication in accordance with IEEE standard 802.11. The computer system may include a computer-readable medium having computer-executable instructions, which, when executed, perform a method that includes exchanging control information. The driver module exchanges control information with the network adapter to at least partially control the network adapter. The control information may be exchanged with the network adapter via a hardware control interface. The hardware control interface may be designed to exchange network adapter independent control information with at least two network adapters of different types.

Yet another embodiment relates to a method of developing a driver module. The method includes analyzing a hardware control interface developed by a first developer entity that is independent of second developer entity which is developing the driver module. The hardware control interface has been developed such that at least two network adapters of different types can exchange network adapter independent control information via the hardware control interface. The method also includes designing a driver to at least partially control one or more of the at least two network adapters via the hardware control interface to engage in IEEE 802.11 wireless communication.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 illustrates transmission control information that may be provided to a network adapter by a hardware control interface, according to some embodiments;

FIG. 3 illustrates transmission status information that may be provided to a driver module by a network adapter, according to some embodiments;

FIG. 4 illustrates reception control information that may be provided to a hardware control interface by a network adapter, according to some embodiments;

DETAILED DESCRIPTION

As discussed above, some computers are configured to engage in wireless communication using a specially-designed driver that controls a network adapter to communicate according to IEEE standard 802.11. Previously, each driver was specially designed to function with a single type of network adapter. As a consequence, a different type of software driver has been provided to control each different type of network adapter. Different developers might design their drivers and/or network adapters differently, resulting in different information being exchanged between them. Additionally, a developer might design one driver to function with a particular model of network adapter and another driver to function with a different model, as different network adapter models might have different specifications. For example, different network adapter models might be configured to engage in wireless communication at different speeds. One network adapter might be capable of communicating at a relatively low speed (e.g., in accordance with IEEE Standard 802.11b), but a different network adapter may be capable of communicating at a relatively high speed (e.g. in accordance with IEEE Standard 802.11g). As a result, previous interfaces between drivers and network adapters might be different depending on the requirements of a particular network adapter.

Applicants have appreciated that a variety of problems may arise from providing hardware control interfaces that are specialized to a particular type of network adapter. As one example, creating new drivers for each different type of network adapter may be expensive and time-consuming for network adapter developers, as they may need to develop and test the network adapters with their drivers for each new network adapter released. As another example, specialized hardware control interfaces are sometimes not designed adequately to perform at the speeds required by IEEE standard 802.11, particularly when control information is exchanged over a serial bus (such as a universal serial bus), possibly causing the driver to crash.

Applicants have developed a standardized hardware control interface for network adapters that communicate according to IEEE standard 802.11. Providing a standard hardware control interface may simplify network adapter and software driver development. As a result, network adapters may be designed to function with a standardized hardware control interface, relieving network adapter developers of the need to provide such an interface and increasing software driver reliability.

Figure 1:
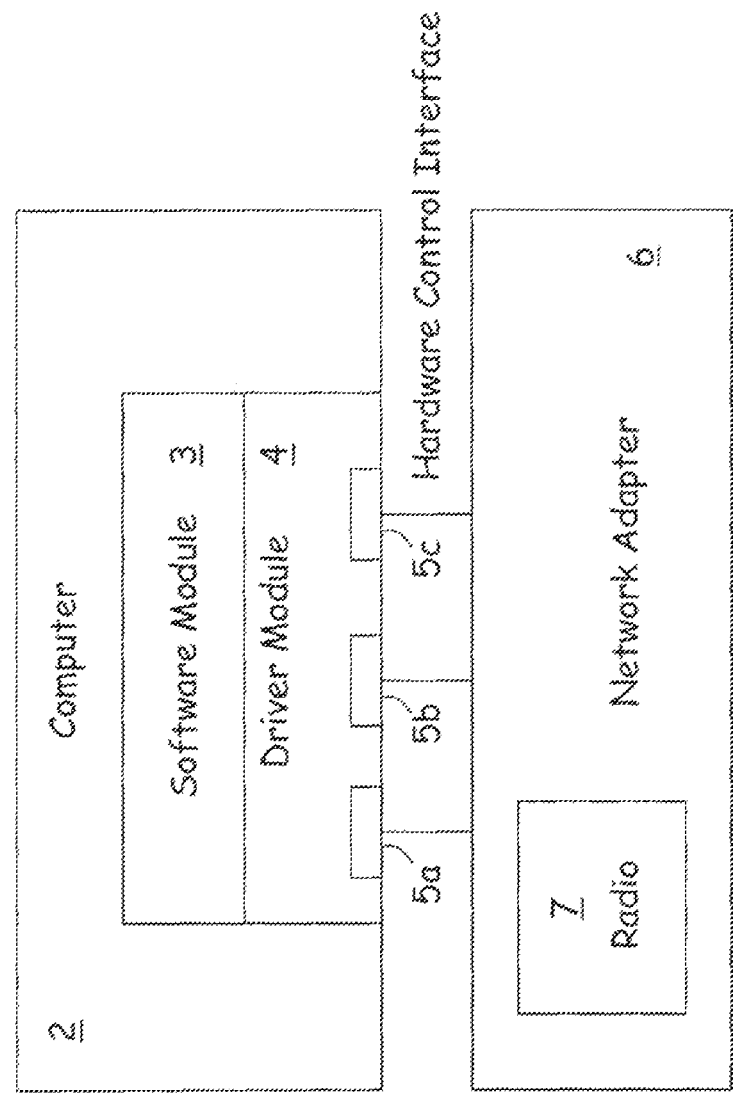
FIG. 1 is a block diagram illustrating an example of a computing environment having a standardized hardware control interface, according to some embodiments.

FIG. 1 is a block diagram illustrating an example of a computing environment 1, according to some embodiments. Computing environment 1 includes a computer 2 that runs software module 3 and a driver module 4. Driver module 4 includes a hardware control interface 5 having a plurality of interface components (a, b and c) for interfacing with a network adapter. Computing environment 1 also includes a network adapter having a radio 7 for engaging in wireless radio frequency communications.

Software module 3 may engage in network communication over a wireless network via driver module 4. Driver module 4 may send and/or receive one or more control messages with network adapter 6, which controls radio 7 to engage in wireless radio frequency communications, including the sending and/or receiving of a wireless message. Using radio 7, network adapter 6 may enable computer 1 to communicate with another wireless-enabled device. It should be appreciated that network adapter 6 may engage in wireless communication with any suitable device, as the techniques described herein are not limited in any way by the device with which wireless communication is performed.

Computer 2 may be any suitable type of computing device that includes at least one processor. By way of example and not limitation, computer 1 may be a laptop computer, a desktop computer, a cellular telephone or a personal digital assistant. In some embodiments, the at least one processor processors may have an operating system that executes thereon. Software module 3 may be any suitable software that executes on the processing unit. In some embodiments, software module 3 may be a portion of the operating system configured to support network communications, but the invention is not limited in this respect. As one example, software module 3 may be a portion of the TCP/IP (Transport Control Protocol/Internet Protocol) stack.

Software module 3 may engage in network communication by exchanging information with driver module 4. Driver module 4 may be a software module that executes on a processing unit of computer 2, and may be configured to control a network adapter to engage in wireless communications in accordance with IEEE standard 802.11. Driver module 4 may exchange control signals with network adapter 6 via a hardware control interface 5. Hardware control interface 5 may be a portion of driver module 4 that is configured to exchange control information with network adapter 6 for wireless communications according to IEEE standard 802.11, as discussed in further detail below. Network adapter 6 may include hardware, firmware and/or software configured to exchange control information with driver module 4 via hardware control interface 5. At least partially based on the control information exchanged with driver module 4, network adapter 6 may send and/or receive data via a wireless medium by controlling radio 7 to transmit and/or receive wireless messages in accordance with IEEE standard 802.11.

In one embodiment, hardware control interface 5 may be a standardized hardware control interface. The term "standardized" means that the hardware control interface is configured to exchange control information with a plurality of different types of network adapters. Thus, any of a variety of different network adapters may be configured to exchange information with driver module 4 using hardware control interface 5. Hardware control interface 5 may be network adapter independent, such that hardware control interface 5 is suitable for operating with any suitable type of network adapter. Providing a standardized hardware control interface may simplify network adapter design, development and testing and increase network adapter reliability, which are key benefits to a standardized hardware interface in some embodiments.

Hardware control interface 5 may exchange information with network adapter 6 using any suitable type of data bus. Thus, in one aspect, hardware control interface may be bus-independent such that it is capable of operating with any of a plurality of different bus types, such as a serial bus or a parallel bus.

Hardware control interface 5 may include one or more interface components, such as interface components 5a, 5b and 5c. In one aspect, a standard hardware control interface may include a relatively small number of interface components, such as less than fifty and/or less than ten. Providing a standard hardware control interface with a relatively small number of hardware control interface components may simplify driver and network adapter design compared with prior systems. Each network interface component may be configured to send and/or receive a portion (a "field") of the control information exchanged with a network adapter, as will be discussed in further detail below.

In some embodiments, hardware control interface 5 may include a transmission control interface component 5a. The transmission control interface component 5a may be configured to provide transmission control information to network adapter 6 for the transmission of data packets) on the wireless medium. Any suitable type of transmission control information may be provided, some examples of which are illustrated in FIG. 2.

FIG. 2 illustrates an example of transmission control information 20 that may be provided to network adapter 6 using transmission control interface 5a in accordance with one embodiment, although the invention is not limited to the example illustrated in FIG. 2. The transmission control information may include one or more fields 21 of transmission control information 20 that the transmission control interface is configured to provide.

As illustrated in FIG. 2, a first field may include one or more flags that indicate a parameter of the data transmission. Any suitable types of flags may be used, such as a flag that indicates whether the wireless medium is to be held or released after transmission of a packet, whether acknowledgement is required for a wireless message, whether a packet is to be encrypted, the type of packet preamble to be used, and/or any other suitable type of flag that indicates any suitable transmission-related information. A flag may include a single bit or multiple bits. In one aspect, seven or more flags may be used, as illustrated in FIG. 2. However, it should be appreciated that any suitable number of flags may be used, as the techniques described herein are not limited in this respect.

As further illustrated in FIG. 2, a second field may include information relating to the transmission rate that is to be used by the network adapter. A third field may include arbitration inter-frame space number (AIFSN) information. A fourth field may include maximum and/or minimum contention window size information (CWmin, CWmax). A fifth field may include basic service set (BSS) information and/or peer table information. However, it should be appreciated that these are only examples of information that may be provided by transmission control interface component 5a to at least partially control network adapter 6, and the techniques described herein are not limited to the exchange of these particular types of information. In some embodiments, this information may be provided by transmission control interface component 5a in the same field and/or bit configuration and having the same order as illustrated in FIG. 2. However, exchange of other types of information and/or other data configurations are possible.

In some embodiments, hardware control interface 5 may include a transmission status interface component 5b configured to provide transmission status information to driver module 4 regarding the status of a transmission by the network adapter.

FIG. 3 illustrates an example of transmission status information 25 provided by network adapter 6 and received by a transmission status interface component 5b, although the invention is not limited to the example illustrated in FIG. 3. As discussed above with respect to transmission control interface component 5a, the transmission status interface component 5b may include one or more fields 36 of transmission status information 25 that the transmission status interface component 5b is configured to receive.

As illustrated in FIG. 3, a first field may include one or more flags related to the status of the transmission. Any suitable transmission status flags may be used, such as a flag that indicates the failure of transmission. A second field may include information about the number of times that the network adapter has attempted to re-transmit a packet. A third field may include transmission rate information indicating, the data rate at which a packet was successfully transmitted. A fourth field may include information about the data rate at which an 802.11 acknowledgement frame (ACK frame) was received. A fifth field may include received signal strength information (RSSI) about the strength of the signal received by the network adapter. A sixth field may include information related to a noise floor of an 802.11 ACK frame. In some embodiments, this information may be provided to transmission status interface component 5b in the same field and/or bit configuration and having the same order as illustrated in FIG. 3. However, exchange of other types of information and/or other data configurations are possible.

In some embodiments, hardware control interface 5 may include a reception control interface component. The reception control interface component may be configured to receive reception control information from network adapter 6 for the reception of data. Any suitable type of reception control information may be provided.

FIG. 4 illustrates an example of reception control information 30 provided by network adapter 6 and received by a reception control interface component 5c, although the invention is not to the example illustrated in FIG. 4. As discussed above with respect to transmission control interface component 5a, the reception control interface component 5c may include one or more fields 31 of reception control information 30 that the reception control interface component 5c is configured to receive.

As illustrated in FIG. 4, a first field may include one or more flags that indicate a parameter of the data reception. Any suitable types of flags may be used, such as a flag that indicates whether a buffer (e.g., a reception buffer of network adapter 6) has overflowed, whether a reception error has occurred, whether an address has been matched, whether a key is available, whether decryption of a received packet has failed, whether the received packet is a probe response, and/or any other suitable reception related information. In one aspect, six or more flags may be used, as illustrated in FIG. 4

A second field may include information about the rate at which data is received by the network adapter 6. A third field may include information about the strength of the signal carrying the received data. A fourth field may include information about the noise floor, such as how much background noise is present on the wireless medium. A fifth field may include information indicating the channel on which a particular packet has been received. A fifth field may include information indicating a time at which a packet was received. However, it should be appreciated that these are only examples of information that may be provided to reception control interface component 5c by network adapter 6, and the techniques described herein are not limited to the exchange of these particular types of information. In some embodiments, this information may be received by reception control interface component 5c in the same field and/or bit configuration and having the same order as illustrated in FIG. 4. However, exchange of other types of information and/or other data configurations are possible.

Three examples of host control interface components have been described with respect to FIGS. 1-4. However, any of a variety of hardware control interface components may be used. One example is an interface component configured for the exchange of channel control information for switching between different channels. The channel control information may include a first field related to a band or channel, a second field that includes a power level for transmitting via a new channel and/or a third field that includes one or more transmission queue flags Another example of a hardware control interface component is an interface component configured to provide beacon transmission control information to network adapter 6 such that network adapter 6 transmits IEEE standard 802.11 beacon messages. Yet another example is an interface component configured to exchange power control information with network adapter 6. Further illustrative interface components are described in further detail below in the section entitled. "Example 1."

As discussed above, one embodiment is directed to employing a standardized hardware control interface for use with IEEE standard 802.11 wireless communications. As used herein, the term IEEE standard 802.11 refers to the 802.11 family of standards. The techniques described herein may be used for any of these standards, including legacy IEEE standard 802.11, IEEE standard 802.11b, IEEE standard 802.11a, IEEE standard 802.11g, IEEE standard 802.11n or any other suitable 802.11 standard including those developed hereafter.

Figure 5:
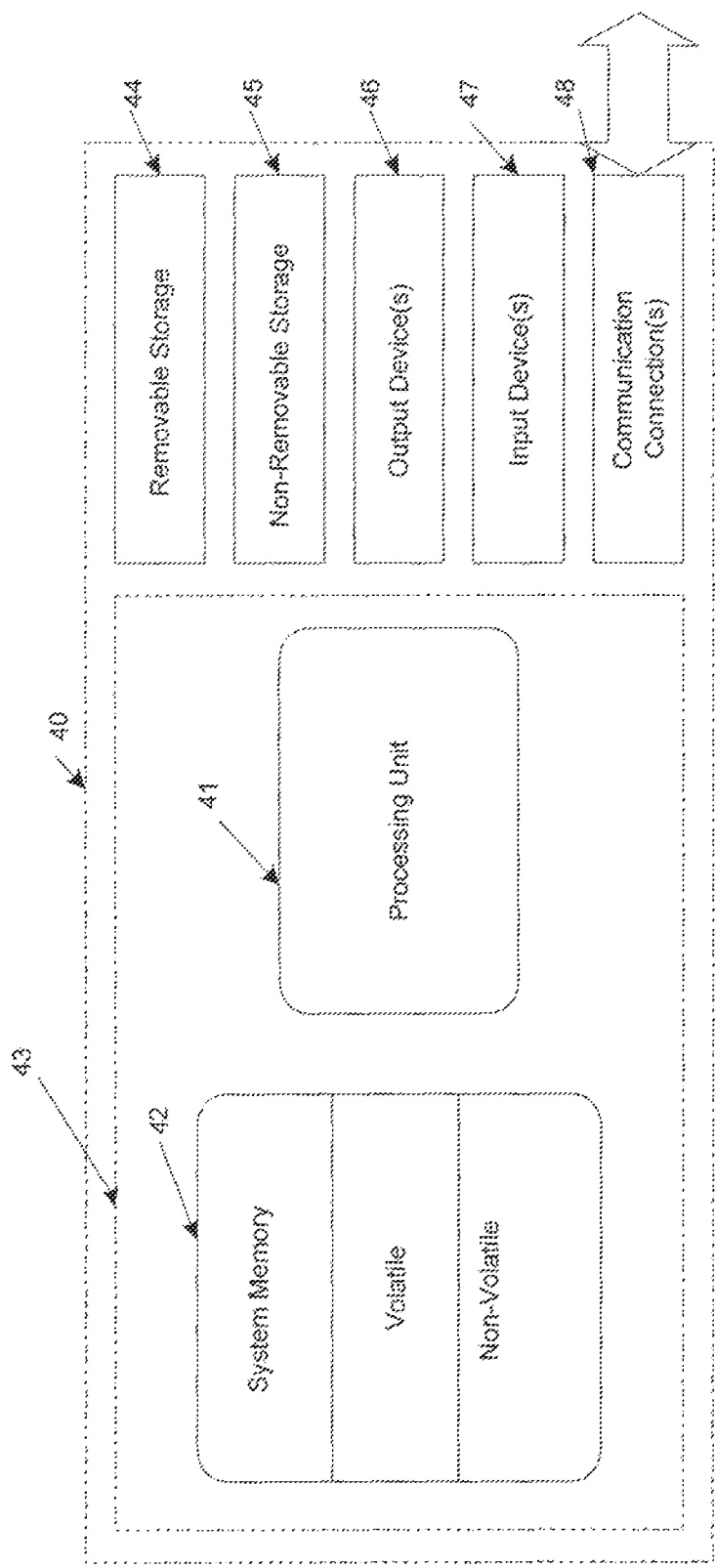
FIG. 5 illustrates an exemplary computing system on which embodiments may be implemented.

A computing system will now be described, on which embodiments of the invention may be implemented. With reference to FIG. 5, an exemplary system for on which embodiments of the invention may be implemented includes a computing device, such as computing device 40, which may be a device suitable to function as computer 2, for example. Computing device 40 may include at least one processing unit 41 and memory 42. Depending on the exact configuration and type of computing device, memory 42 may be volatile, non-volatile or some combination of the two. One possible configuration is illustrated in FIG. 5 by dashed line 43. Additionally, device 40 may also have additional features/functionality. Memory 42 is a form of computer-readable media that may store information such as computer-readable instructions, which, when executed, implement software module 3, driver module 4 and/or hardware control interface 5.

Device 40 may include at least some form of computer readable media. Computer readable media can be any available media that can be accessed by device 40. By way of example, and not limitation, computer readable media may comprise computer storage media and communication media. For example, device 40 may also include additional storage (removable and/or non-removable) including, but not limited to, magnetic or optical disks or tape. Such additional storage is illustrated in FIG. 5 by removable storage 44 and non-removable storage 45. Computer storage media includes volatile and nonvolatile, removable and non-removable media implemented in any method or technology for storage of information such as computer readable instructions, data structures, program modules or other data. Memory 12, removable storage 44 and non-removable storage 45 are all examples of computer storage media.

Device 40 may also include output device(s) 46, input device(s) 47 and/or one or more communication connection (s) 48. Communication connection(s) 48 may include, for example, a bus interface that enables device 40 to communicate with network adapter 6 via any suitable data bus, such as a parallel bus or a serial bus.

It should be appreciated that the invention is not limited to executing on any particular system or group of systems. For example, embodiments of the invention may run on one device or on a combination of devices. Also, it should be appreciated that the invention is not limited to any system or network architecture Example 1

One exemplary embodiment will now be described with respect to an illustrative hardware control interface specification. It should be appreciated that the illustrative specification is merely one possible implementation according to the techniques described herein, as the techniques described herein are not limited to those described in the following illustrative specification. Furthermore, although the following specification contains words such as "shall" and "must," such words only apply to with respect to the illustrative specification below, as other embodiments are not so limited.

1 Definitions

Delayed PS-Poll

This is the case in which the AP replies a PS-Poll control frame with an 802.11 ACK control frame and transmits the buffered 802.11 data or management frame at a later time.

Device-sourced packet

This is an outgoing packet generated by device itself. A device-sourced packet must be an in-BSS packet or a packet which doesn't have BSSID field.

Examples of device-sourced packets are in-BSS 802.11 probe responses (for the BSS which the device is transmitting beacons), 802.11 ACK, 802.11 RTS, 802.11 null data packets, etc.

Group Address

A group Address is a MAC address in which "I/G address bit" is set to 1. The definition of group address is orthogonal to "U/L address bit" and OUI type. Therefore, unless specifically mentioned otherwise, a group address can be either universally or locally administered. A universally administered group address can be either standard IEEE or proprietary.

For example, the following are all valid group addresses:

| | |
|---|---|
| FF:FF:FF:FF:FF:FF | All one's broadcast address (standard IEEE group address) |
| 09:00:2B:00:00:04 | Standard MAC group address used in ISO 9542 |
| 01:50:f2:00:00:01 | Microsoft proprietary group address (Universally administered with Microsoft OUI) |
| 03:01:02:03:04:05 | A locally administered group address (OUI is not applicable) |

Group BSSID

This is a BSSID using a group address.

Host-sourced packet

This is an outgoing packet generated by host.

Immediate PS-Poll

This is the case in which the AP replies a PS-Poll control frame with a buffered 802.11 data or management packet.

In-BSS Packet

For packet which contains BSSID field, this is a packet with BSSID matching one of the BSS's in which the device has joined.

In-BSS concept is not applicable to packets which don't have BSSID field. At the time of this specification is written, 802.11 control packets don't have BSSID.

Individual Address

Also called unicast address

An Individual Address is a MAC address in which "I/G address bit" is set to 0.

Individual BSSID

This is a BSSID using an individual address.

Out-of-BSS Packet

For packet which contains BSSID field, this is a packet with BSSID not matching any BSS in which the device has joined.

Out-of-BSS concept is not applicable to packets which don't have BSSID field. At the time of this specification is written, 802.11 control packets don't have BSSID.

Retransmission Rate Adaptation

Retransmission Rate Adaptation is the capability of selecting a lower data rate when packet retransmission is needed.

Transmission Rate Adaptation

Transmission Rate Adaptation is the capability selecting the optimal or near optimal data rate for the first transmission of each packet. Transmission Rate Adaptation usually requires historical information.

Wildcard BSSID

A BSSID has value of FF:FF:FF:FF:FF:FF

Wildcard SSID

A zero length SSID

2 Assumptions

Little endian is assumed unless specified otherwise, that is, bit 0 is least significant bit and byte 0 is least significant byte.

3 MAC Sub-layer Functions

This section describes the HCI's implementation of MAC Sub-layer functions. For each section here, there is one corresponding section in section 9 in the IEEE 802.11 specification.

3.1 MAC Architecture

N/A

3.2 DCF

Device performs DCF procedure using host supplied DCF parameters, such as AIFSN, ECWmin and ECWmax, on a per-packet basis. DCF parameters are passed to device in TxDescriptor (section 7.4).

For non-QoS packets, host set AIFSN to 2. Here, 2 comes from *DIFS=2×aSlotTime+SIFS*. For QoS packet, host set AIFSN according to the packet AC (Access Category). Device can calculate AIFS as *AIFSN×aSlotTime+SIFS*.

This design makes the packet access category transparent to device while at the same time give host the flexibility to tune DCF timing parameters. When timing parameters are set properly, this design is compatible to with IEEE 802.11 specification, including other timing parameters derived from SIFS/DIFS/AIFS. For example, according to section 9.2.3.5 in the IEEE 802.11 Specification, > "...Reception of an error-free frame during the *EIFS* or *EIFS-DIFS+AIFS[AC]* resynchronizes the STA to the actual busy/idle state of the medium, so the *EIFS* or *EIFS-DIFS+AIFS[AC]* is terminated and normal medium access ..."

For normal packet, if host set AIFSN to 2, AIFS will essentially equal to DIFS. Therefore, *EIFS-DIFS+AIFS[AC]* equals to *EIFS*.

Regardless of whether device supports QoS, device shall allow host to control DCF parameters on a per-packet basis.

3.2.1 RTS/CTS

Host is responsible for choosing RTS/CTS on a per-packet basis. The information is passed to device in TxDescriptor (section 7.4). "RTS Protection Bit" will be set to 1 when RTS is need.

3.2.2 RTS with fragmentation

Host is responsible for choosing RTS/CTS and performs fragmentation on a per-packet basis. The information is passed to device in TxDescriptor (section 7.4). Specifically, for this particular situation,

- *Hold Medium Bit* in TxDescriptor will be set to 1. This tells device to hold the wireless medium and transmit the next frame within SIFS interval.
- *RTS Protection Bit* in TxDescriptor will be set to 1. This tells device to invoke RTS/CTS procedure before the transmitting the packet.
- *No ACK* Bit is usually set to 0 unless BlockACK is being used.

Device shall ensure the proper on-air behavior as defined in section 9.2.5.6 in the IEEE 802.11 Specification.

3.3 Fragmentation

Host is fully responsible for performing fragmentation. When fragmentation is used,

- *Hold Medium Bit* in TxDescriptor will be set to 1. This tells device to hold the wireless medium and transmit the next frame within SIFS interval.
- *No ACK* Bit is usually set to 0 unless BlockACK is being used.

Device is required for ensuring the SIFS interval requirement which is defined in the IEEE 802.11 specification.

3.4 Defragmentation

Host is fully responsible for performing defragmentation.

3.5 Multirate Support

Case 1 Device doesn't support transmission and retransmission rate adaptation
This is the case where device clears both Bit 0 and Bit 1 in TxCapabilities field in GlobalCapability defined in section 7.2.1.

Host chooses data rate for the first transmission as well as retransmissions. Host also determines the maximum number of retransmissions which device shall perform. The information is passed to the device in TX descriptor (section 7.4).

Host usually will request device to report status of the transmissions. For USB device, this is done by setting TxId field to a non zero value in NWF_USB_MSG_TX_PACKET (section 8.3.1). Upon transmission completion, device reports to the host the number of retransmission performed in TXStatus (section 7.5). That information, along with other information such as RSSI, will be used for adjusting data rates for the subsequent transmissions.

Case 2 Device doesn't support transmission rate adaptation, but it supports retransmission rate adaptation

This is the case where device clears Bit 0 and sets Bit 1 in TxCapabilities field in GlobalCapability defined in section 7.2.1.

In this case, host determines the maximum number of retransmissions and the data rate for the first transmission. Device is responsible for selecting the retransmission data rates. The host controlled information is passed to the device in TX descriptor (section 7.4). Device should use the retransmission data rates in TX descriptor to determine the maximum number of retransmissions by counting the number of non-zero data rates. It can ignore the actual data rate values and use its own retransmission rates.

Host usually will request device to report status of the transmissions. For USB device, this is done by setting TxId field to a non-zero value in NWF_USB_MSG_TX_PACKET (section 8.3.1). Upon transmission completion, device reports to the host the number of retransmission performed in TXStatus (section 7.5). That information, along with other information such as RSSI, will be used for adjusting data rates for the subsequent transmissions.

Case 3 Device support transmission and retransmission rate adaptation

This is the case where device sets both Bit 0 and Bit 1 in TxCapabilities field in GlobalCapability defined in section 7.2.1.

In this case, host determines the maximum number of retransmissions. Device is responsible for selecting the transmission and retransmission data rates. Device should use the data rate array in TX descriptor (section 7.4) to determine the maximum number of retransmissions by counting the number of non-zero data rates. It can ignore the actual rate values and use its own values.

Upon transmission completion, device is expected to report TX status information including TX success/failure, retransmission count, and the data rate of the last (re)transmission, etc. Host uses this information for determining whether roaming is needed.

Case 4 Device support transmission rate adaptation, but it doesn't support retransmission rate adaptation

This case may not be supported. If device supports transmission rate adaptation, it must also support retransmission rate adaptation.

Regardless of device rate adaptation capabilities, BSSEntry (section 7.7.1) in device's BSSTable contains the basic data rate for the BSS. The basic data rate information is used by device for choosing data rate for device sourced packets such as 802.11 ACK.

3.6 MSDU transmission restrictions

When transmitting packets, device shall preserve the order of packets in which they are submitted to the device's transmission queues (section 6.2.2).

When indicating packets to the host, device shall preserve the order of packets in which they are received from the air.

3.7 Operation across regulatory domains

Device has a default regulatory domain and *SupportedRegDomains* (see section 7.2.3) stored in a device specific persistent storage. At initialization time, device should set the current regulatory domain to its default regulatory domain. Host can query the default regulatory domain and *SupportedRegDomains*. If needed, host can change device's current regulatory domain. Device has only one current regulatory domain even though it may join multiple BSS operating in different regulatory domains.

Device is responsible for all the regulatory compliance requirements except for the following:
1. For host-sourced packets, host selects transmission power level on a per-packet basis. Host ensures that the requested transmission power level doesn't exceed the regulatory limit. Transmission power information is passed to device in TxDescriptor (section 7.4).
2. Host is responsible for selecting the active scanning channels in a manner that is compliant to the current regulatory domain.
3. For device-sourced packets, device should use the transmission power level defined in CurrentChannel.TxPowerIndex (see section 7.9.2 for details).

3.8 HCF

This section is applicable only when device set Bit 0 in QoSCapabilities field in GlobalCapability defined in section 7.2.1.

3.8.1 EDCA

EDCA is based on DCF. This HCI design doesn't differentiate DCF and EDCA since host can supply ECWmin, ECWmax and AIFSN parameters. See DCF (section 3.2) and TxDescriptor (section 7.4) for details.

This design requires device to support 5 transmission queues (see section 6.2.2 for details). Host will put packets into appropriate transmission queues based on the access category of the packets. However, device must always use the DCF/EDCA parameters in TxDescriptor (section 7.4). It must not calculate EDCA/DCF timing parameters based on the transmission queue which the packets are in.

3.9 Block Acknowledgement (Block Ack)

This section is applicable only when device set Bit 0 in QoSCapabilities field in GlobalCapability defined in section 7.2.1.

Host is fully responsible for setting up, updating and tearing down BlockACK agreement with the peer.

When transmitting packets to peer with which there is a BlockACK agreement, host determines whether BlockACK should be used on a per-packet basis. This information is passed to device in TxDescriptor (section 7.4). Specifically, the following bits are set in TxDescriptor
- *Hold Medium Bit* is set to 1. This tells device to hold the wireless medium and transmit the next frame within SIFS interval.
- *No ACK* Bit is set to 1. This tells device not to wait for 802.11 ACK before transmitting the next packet.

For details of BlockACK operations, see section 6.2.6 for BlockACK transmission and section 6.1.3, 6.1.5 and 6.1.6 for reception.

3.10 No Acknowledgement (No Ack)

This section is applicable only when device set Bit 0 in QoSCapabilities field in GlobalCapability defined in section 7.2.1.

Host determines whether ACK is needed on a per-packet basis. This information is passed to device in TxDescriptor (section 7.4). Specifically, the following bits are set in TxDescriptor
- *Hold Medium Bit* is set to 1. This tells device to hold the wireless medium and transmit the next frame within SIFS interval.
- *No ACK* Bit is set to 1. This tells device not to wait for 802.11 ACK before transmitting the next packet.

As we can see here, NoACK operation is same as BlockACK operation from the device's point of view. The difference is in the host side. With BlockACK setup, host will place a BlockACKReq at the end of packet queue.

For details of NoACK operations, see section 6.2.6 for BlockACK transmission and section 6.1.3, 6.1.5 and 6.1.6 for reception.

3.11 Frame exchange sequences

N/A

3.12 Protection mechanism for non-ERP receivers

Host determines whether and how protection should be used on a per-packet basis. The protection information is passed to the device in TX descriptor (section 7.4). The host may choose to use either RTS/CTS or CTS-to-Self. Specifically,
- *RTS Protection Bit* is set to 1 when RTS/CTS protection is needed
- *CTS Protection Bit* is set to 1 when CTS-to-self protection is needed
- Host ensures that *RTS Protection Bit* and *CTS Protection Bit* will not be both set to 1 on the same packet.

4 MLME SAP interface

This section describes the HCI's implementation of MLME SAP interface. For each section here, there is one corresponding section in section 10.3 in the IEEE 802.11 specification.

4.1 Scan

Host is fully responsible for performing scanning. Host may require device to perform the following actions during scanning:
1. Suspend Transmission Queue
   See section 6.2.2 for more information about transmission queue management.
2. Suspend Automatic Beacon Transmission (if the system is operating as an IBSS node or an 802.11 access point)

See section 6.3 and 7.6 for more information about beacon generation.

3. Switch Channel

See section 7.9.2 for channel switching.

4. Transmit 802.11 probe request packets (if active scanning is needed)

See section 6.2, 7.4, and 7.5 for packet transmission.

5. Resume Transmission

See section 6.2.2 for more information about transmission queue management.

6. Resume Automatic Beacon Transmission

See section 6.3 and 7.6 for more information about beacon generation.

4.2 Synchronization (Join)

Host joins a BSS by adding a BSSEntry (section 7.7.1) in the device BSSTable. The BSSEntry can be used by device for synchronizing its TSF timer with the BSS.

Device must complete adding BSSEntry into BSSTable as soon as possible without waiting for receiving 802.11 beacon/probe response from the BSS. Therefore, there could be a short period in which host exchanges 802.11 management and data packets with the BSS without proper synchronization (assuming that scanning happens long time ago and hence *LastBssTime* and *LastLocalTime* become outdated).

Note: when operating as an infrastructure STA, host may not add BSSEntry into the device. When this happens, from device's perspective, "join" is skipped.

4.3 Authenticate

Host is fully responsible for performing authentication procedure. There is no special requirement on device. Device is not aware of authentication state.

Device must not assume that joining always occurs before authentication.

4.4 Deauthenticate

Host is fully responsible for performing deauthentication procedure.

4.5 Associate

Host is fully responsible for performing association procedure. There is no special requirement on device. Device is not aware of association state.

Device must not assume host will always perform authentication before starting association.

4.6 Reassociate

Host is fully responsible for performing reassociation procedure.

Device must not assume host will always perform authentication before starting reassociation.

4.7 Disassociate

Host is fully responsible for performing disassociation procedure.

4.8 Reset

Reset is not defined for device. However, host can request devices perform the following actions during host reset:
1. Remove BSSEntry from device's BSSTable
2. Remove PeerEntry from device's PeerEntry
3. Remove BeaconGroupEntry from device's BeaconGroupTable

4.9 Start

When operating as an 802.11 access point, host will periodically transmit 802.11 beacon frames using the host timer. The BssEntry (section 7.7.1) will contain the basic rate information of the infrastructure BSS to be started. However, the BSSID field in BssEntry may contain wildcard BSSID, in which case the device shall disable its BSSID filtering.

When starting an IBSS station, host will request the device to periodically transmit 802.11 beacon frames. The request is sent to the device via StartIBSSBeacon, defined in section 7.6.1. The BssEntry will contain the basic rate information of the infrastructure BSS to be started. The BSSID field will contain the BSSID of the new IBSS network (since the BssEntry is referenced by StartIBSSBeacon request).

4.10 Channel Switch

See CurrentChannel (section 7.9.2) data structure for details.

4.11 SetKeys

Pairwise keys are stored in PeerEntry (section 7.8.1). Host adds or updates the corresponding PeerEntry in the device PeerTable when it needs to set pairwise key.

Decryption group keys are also stored in PeerEntry. They are managed in a similar way as Pairwise keys. Decryption group keys are used for decrypting incoming broadcast or multicast packets.

Encryption group keys are stored in BSSEntry. Host adds or updates the corresponding BSSEntry when it needs to set encryption group key. Encryption group keys are used for encrypting outgoing broadcast or multicast packets.

Note:

1. MIC key portion of TKIP-MIC key is always stored in host. MIC verification is done in host.
2. Host doesn't always add keys into device. Device must indicate to the host all the received packets for which it can't find a decryption key.
3. Even when host adds keys into device, it may not always add both pairwise key and group key for the same pair. It can happen that host adds pairwise keys to the device, but not group keys.

4.12 DeleteKeys

To delete pairwise and decryption group keys, host deletes or updates a PeerEntry in the device's PeerTable.

To delete encryption group key, host deletes or updates a BSSEntry in the device's BSSTable.

Note: deleting keys doesn't mean that the system is disassociating or deauthenticating from the peer.

4.13 MIC (Michael) failure event

MIC key is always stored in host. Host is fully responsible for MIC verification and MIC failure detection.

4.14 EAPOL

Host is fully responsible for EAPOL exchange.

Device must not assume that host will always perform association before starting EAPOL exchange.

4.15 MLME-PeerKeyStart

Host is fully responsible for obtaining cipher keys.

4.16 SetProtection

Host determines whether and how protection should be used on a per-packet basis. The protection information is passed to the device in TX descriptor (section 7.4).

4.17 MLME-PROTECTEDFRAMEDROPPED

This is not applicable to device. Device shall indicate to host all the received packets for which it can't find cipher keys. Host will decide whether the packet should be dropped or not.

4.18 TS management interface

Host is fully responsible for TS management.

4.19 Management of direct link

Host is fully responsible for direct link management.

4.20 Higher Layer Synchronization Support

Host is fully responsible for higher layer synchronization. Device is required to provide the local time (read from device's TSF timer) at which a packet is transmitted or received. The local time is passed to the device through TXStatus (section 7.5) or RXDescriptor (section 7.3).

4.21 BlockACK

This section is applicable only when device set Bit 0 in QoSCapabilities field in GlobalCapability defined in section 7.2.1.

Host is fully responsible for setting up, updating and tearing down BlockACK agreement with the peer.

When transmitting packets to peer with which there is a BlockACK agreement, host determines whether BlockACK should be used on a per-packet basis. This information is passed to device in TxDescriptor (section 7.4). See section 6.2.6 for BlockACK transmission and section 6.1.3, 6.1.5 and 6.1.6 for reception.

5 MLME

This section describes the HCI's implementation of MLME functionalities. All level 2 sections here can be 1:1 mapped to level 2 sections in section 11 in the IEEE 802.11 specification. Wherever applicable, this section will refer to the corresponding HCI data structures.

5.1 Synchronization

5.1.1 TSF

When operating in IBSS mode, host will set the BSSID field in the BssEntry (section 7.7.1) to the IBSS network in which the host joins. Device is required to synchronize its TSF timer with the IBSS network.

When operating as an infrastructure STA, host doesn't require the device to synchronize its TSF timer with the BSS (host will use the host timer for power saving purpose). Therefore, the BSSID field in the BssEntry may contain wildcard address.

When operating as an IBSS STA, host will set the BSSID field in the BssEntry (section 7.7.1) to the IBSS network. Host system itself doesn't rely on the TSF synchronization. Setting the BSSID is mainly because some device implementation needs the TSF synchronization for implementing the distributed beacon mechanism defined in section 11.1.2.2 in the IEEE 802.11 Specification.

5.1.2 Beacon Generation

When operating as an 802.11 access point, host will generate and transmit beacon frames at every TBTT. Device is required to fill the Timestamp in the beacon frames with the device's TSF timer value.

When operating as an IBSS STA, host will request device to generate beacons at every TBTT. The request is sent to the device via StartIBSSBeacon request (section 7.6.1).

5.1.3 Probe Request Processing

See section 6.1.7.

5.1.4 Probe Response and Host Sourced Beacon

See section 6.2.8.

5.1.5 Scanning

See section 4.1.

5.2 Power Management

5.2.1 Power management in an infrastructure network

*5.2.1.1 AP TIM transmissions*
Host is responsible for setting the DTIM and the *partial virtual bitmap*, in the beacon packets which the host transmits at every TBTT. The *partial virtual bitmap* is described in section 7.3.2.6 in the IEEE 802.11 Specification.

*5.2.1.2 Power Management with APSD*
Host is fully responsible for implementing APSD for both access point mode and 802.11 infrastructure client mode.

Host should ensure that the host timer is configured to the required resolution (millisecond level) to support A-APSD.

5.2.1.3 AP operation during the CP

When operating as an 802.11 access point, host implements the following:
1. Keep tracking of power management status for each currently associated STA
2. Advertise APSD support in the beacon if device set Bit 0 in QoSCapabilities field in GlobalCapability defined in section 7.2.1.
3. Process TSPEC and maintain APSD status for each currently associated STA
4. Buffer MSDU or management frames destined for power saving STAs
    a. Transmit buffered MSDU/management frames upon receiving PS-Poll
    b. Transmit buffered MSDU/management frames when STA switches into active mode
    c. Implement packet aging functionality
5. Buffer broadcast/multicast MSDUs for which the Order bit in the Frame Control field is clear.
    a. Transmit buffered frames upon DTIMs
    b. Transmit buffered MSDU/management frames when all the associated STAs are in active mode
6. Transmit 802.11 beacons at every TBTT with most recent *partial virtual bitmap* and DTIM.
7. Transmit A-APSD packets at each scheduled ASPD service period
8. Transmit U-APSD packets upon receiving trigger frames.

Device is required to indicate PS-Poll 802.11 control frame to the host. Device is not required to maintain power management status for each currently associated STA. Therefore, STA will lose packets which have already been posted in the transmission queue prior to the "active → power saving" transition.

5.2.1.4 AP operation during the CFP

This is not applicable since this specification doesn't support PCF and/or HCCA.

5.2.1.5 Receive operation for STAs in PS mode during the CP

When operating as an 802.11 infrastructure STA, host will implement the following:
1. Host will request device to power on its radio whenever it is appropriate. The algorithm which the host uses is outside the scope of this document.
   To power on the radio, host issues a set request on GlobalState (RadioPowerState field in section 7.9.1)
2. When host detects that the bit corresponding to its AID is set in the TIM, it will post a PS-Poll 802.11 control packet to the device transmission queue to retrieve the buffered MSDU or management frame.
3. Host will request device to put its radio into doze state whenever it is appropriate. The algorithm which the host uses is outside the scope of this document.

To doze the radio, host issues a set request on GlobalState (RadioPowerState field in section 7.9.1)

4. Host will use host's timer for managing the radio power state. Device's TSF timer is not used.

*5.2.1.6 Receive operation for STAs in PS mode during the CFP*

This is not applicable since this specification doesn't support PCF and/or HCCA.

5.3 STA Authentication and Association

See section 4.3, 4.4, 4.5, 4.6 and 4.7.

5.4 Block ACK Operation

Applicable only when device set Bit 0 in QoSCapabilities field in GlobalCapability defined in section 7.2.1.

See section 3.9, 3.10, 4.21, 6.2.6, 6.1.3, 6.1.5 and 6.1.6.

5.5 Higher Layer Timer Synchronization

See section 4.20.

6 Packet Transmission and Reception

6.1 General Packet Reception

In this section, receive path flow is described. Please refer to section 0 for the format of *RxDescriptor*. The following topics are covered.

- Reception of corrupted packets
- Promiscuous reception
- 802.11 control packet reception
- Address 1 Matching
- Packet processing after address 1 matching

- BSSID Matching
- Key Table Lookup
- Decryption

Receive path is designed with the following assumptions:
- Defragmentation is done in host system
- MIC verification in TKIP is done in host system
- Immediate Block ACK may not be supported. Only delayed block ACK is supported.

Host can control five packet filtering behaviors through 4 filters (Duplicate Packet filtering and Address 1 Filtering are controlled by the same filter).

- Corruption Packet Filtering (FilterDiscardCorruptedFrame)
  When this filtering is enabled, device should not indicate corrupted packets (CRC32 error). This filtering is enabled by default.

- Duplicate Packet Filtering (FilterDiscardDuplicateFrame)
  When this filtering is enabled, device should not indicate duplicate packets. Duplicate packets can be detected via Sequence Control field in the MAC header. This filtering is enabled by default.
  If device doesn't implement duplicate packet detection, it can ignore this filter.

- Address 1 Filtering (FilterDiscardAddress1MismatchedFrame)
  When this filtering is enabled, device should not indicate packets with a unicasted receiver address that doesn't match the device's current MAC address. This filtering is applicable to packets with a unicast receiver address. It is enabled by default.

- 802.11 Control Frame Filtering (FilterDiscardControlFrame)
  This filtering is applicable to 802.11 control frames, except PS-Poll, BlockACKReq and BlockACK frames. When it is enabled, device should not indicate 802.11 control packets to which this filtering is applicable. It is enabled by default.

- BSSID Filtering (FilterDiscardBSSIDMismatchedDataFrame)
  This filtering is applicable to 802.11 data frames only. It is enabled when BSSID field of any BssEntry contains a unicast address. When it is enabled, device should not indicate 802.11 data packets with a BSSID which can not be found in BssTable.

Figure 6:
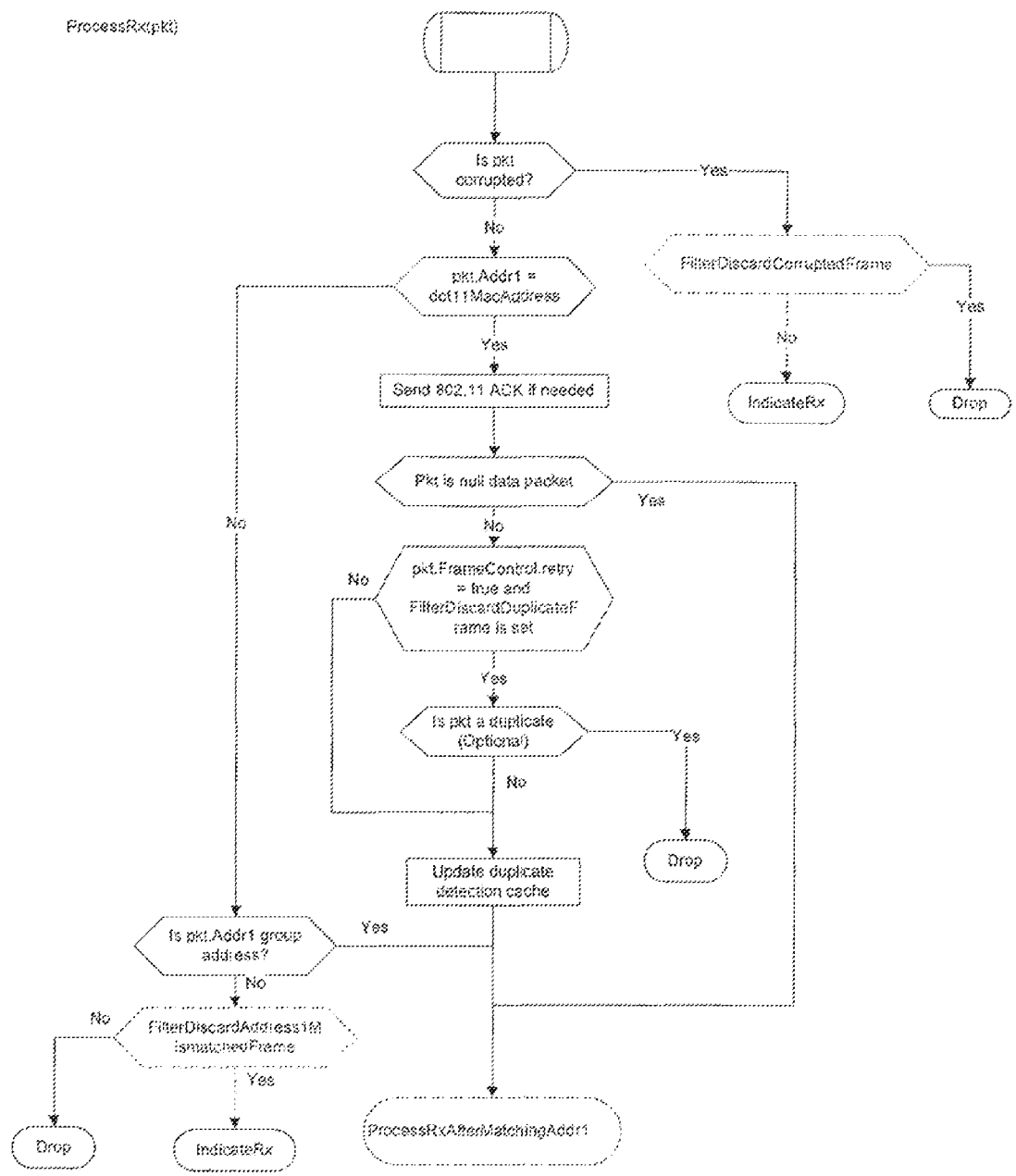
FIG. 6 is a flow chart illustrating an address matching stage, according to some embodiments.
Figure 7:
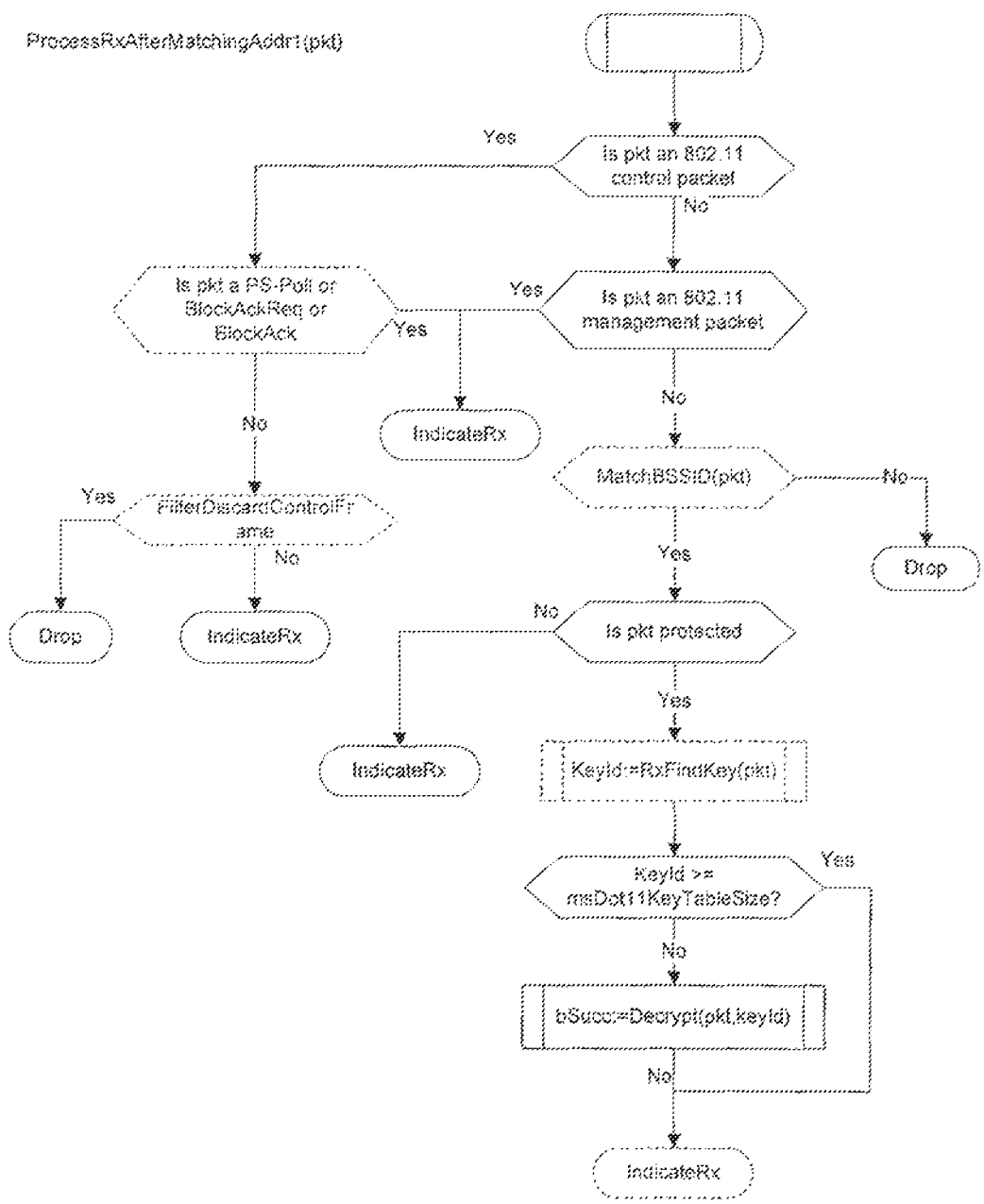
FIG. 7 is flow chart illustrating processing logic after a packet passes an address matching stage, according to some embodiments.

FIG. 6 is the flow chart of address 1 matching stage. The flow chart is for the purpose of illustrating the expected behavior. Implementation doesn't have to exactly follow the flow chart as long as it produces the same output. Microsoft specific operations are highlighted in red text and dash-style lines. Host will always perform packet duplicate detection logic. To pass address 1 matching stage, the *Address 1* field in MAC header must contain either the device's current MAC address or a group address. Duplicate Packet Detection is optional. Host will always perform duplicate packet detection irrespective of whether it has been performed by the device or not.

6.1.1 Reception Processing After Address 1 Matching

This section describes the processing logic after a packet passes *Address 1 Matching* stage. Error! Reference source not found. 7 is the flow chart. Microsoft specific operations are highlighted in red text and dash-style lines. It is worth to point out the following:

1. Device must indicate cipher-protected packets to the host system even when it is unable to find matching key. For such kind of packet indications, the device must set RxFlags.Bit3 (see section 0) in the Rx descriptor.
2. Device must indicate packets which fail in decryption. For such kind of packet indications, the device must set RxFlags.Bit4 (see section 0) in the Rx descriptor. The device doesn't have to indicate the whole packet to the host system. Only the MAC header is needed. This is needed for the host system to increment appropriate per-station statistic counters.

MatchBSSID

Figure 8:
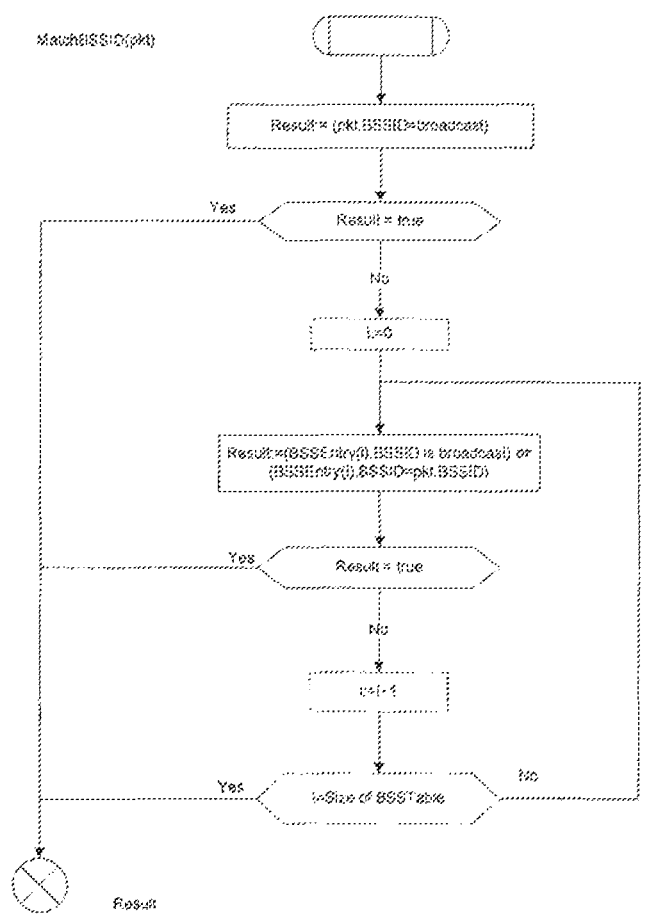
FIG. 8 is flow chart illustrating BSSID matching procedure, according to some embodiments.

This operation is done only on 802.11 data packets. It returns true when packet BSSID matches one of BssEntry in BssTable. Otherwise, it returns false. See FIG. 8 for details. Here the 802.11 data packets can have any combinations of FromDS and ToDS values. When performing BSSID filtering, devices are expected to retrieve packet BSSID from correct Address field (either Address2 or Address 3) based on FromDS to ToDS value.

Note: FromDS/ToDS are only used for determining packet BSSID. It must not be used for packet filtering. Devices must expect to receive and process any data packets irrespective of network mode (infrastructure or ad hoc).

RxFindKey and Decrypt

RxFindKey operation looks up key which will be used for decrypting cipher-protected packets. Decrypt operation decrypt packets using key found by RxFindKey.

See section 6.1.2 for details on key lookup and decryption.

ProcessRxAfterMatchingAddr1

This is the operation in which the device processes packets which pass Address 1 test as defined above. It is described in section 6.1.1.

6.1.2 Key Lookup

Figure 9:
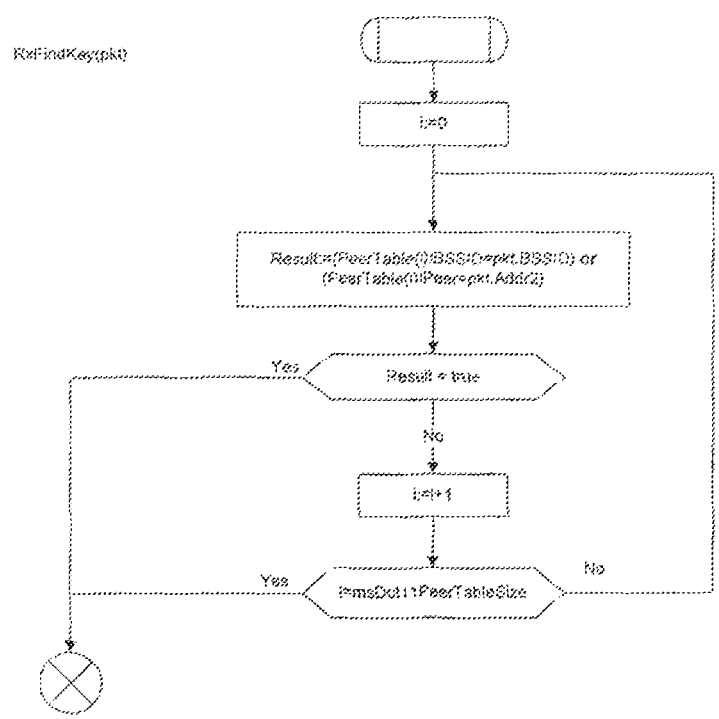
FIG. 9 illustrates a key lookup procedure, according to some embodiments.
Figure 10:
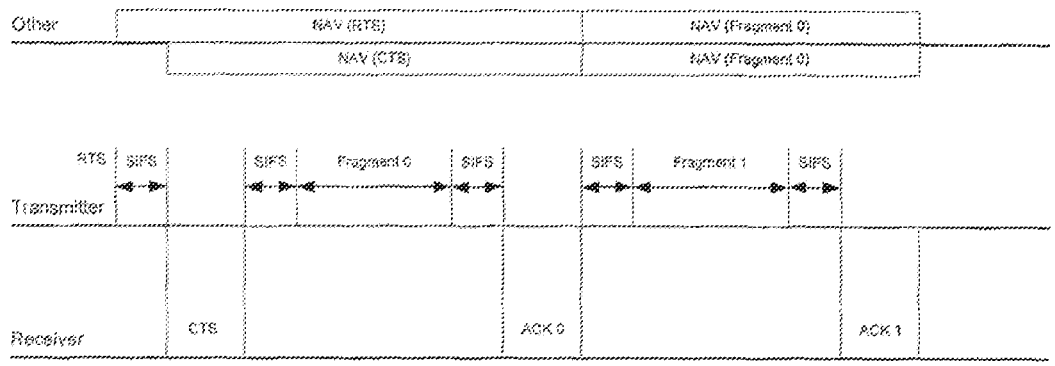
FIGS. 10-13 illustrate transmitter-receiver timing diagrams, according to some embodiments.
Figure 11:
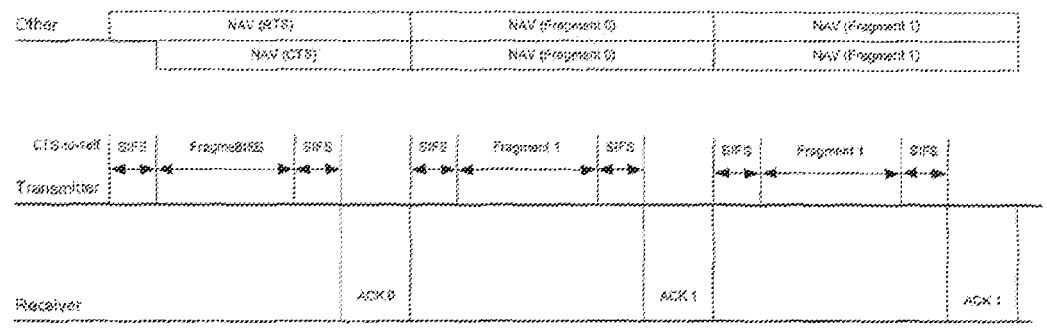
Figure 12:
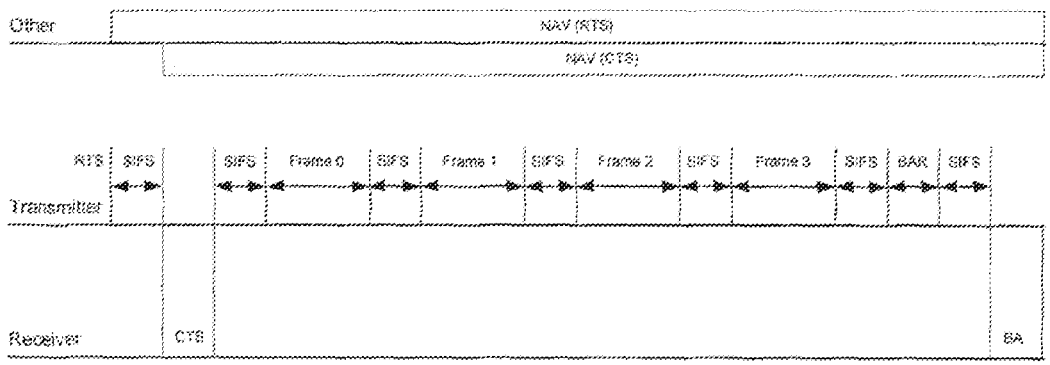
Figure 13:
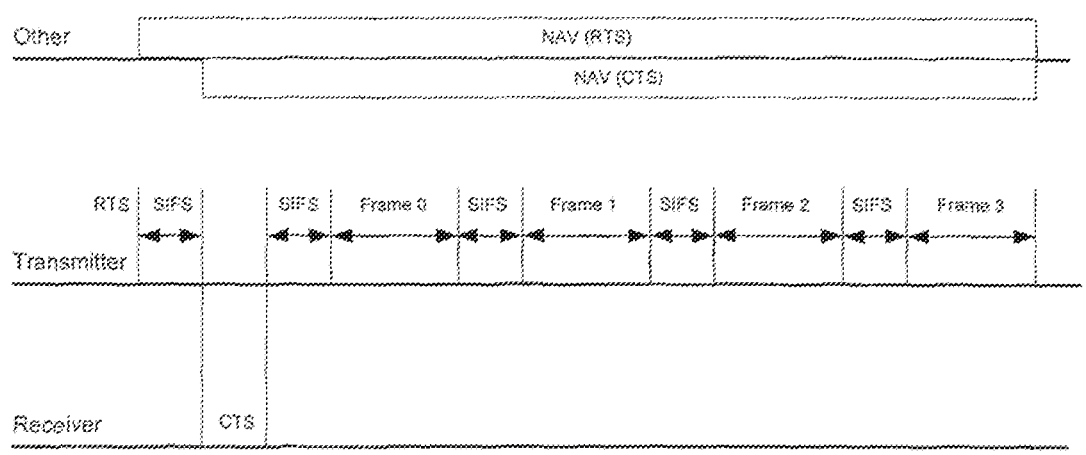

Pairwise keys and decryption group keys are stored in PeerEntry (section 7.8.1). Pairwise keys are used for encrypting and decrypting unicast packets. Decryption group keys are used for decrypting broadcast and/or multicast packets. FIG. 9 illustrates the key look up process. It returns the key index of the matching PeerEntry.

6.1.3 Decryption

Decryption shall not remove cipher header or cipher trailer. Decryption shall not update 802.11 MAC header, e.g., resetting Protected bit in frame control.

6.1.4 Immediate Block ACK RX

Immediate Block ACK may not be supported. The host will not advertise *Immediate Block ACK* capability when running in access point mode.

6.1.5 Delayed Block ACK RX

This section is applicable only when device set Bit 0 in QoSCapabilities field in GlobalCapability defined in section 7.2.1.

Device must send an 802.11 ACK upon receiving an 802.11 *BlockAckReq* frame directed to the device's MAC address.

It is transparent to the device whether there is a block ACK agreement with the transmitter. The host is responsible for buffering packets during a block ACK transferring and processing ADDBA, DELBA, BlockAckReq and BlockAck packets. The device must be able to parse ACK policy subfield in the QoS header. If ACK policy subfield is set to Block ACK, the device must not send 802.11 ACK frame upon receiving the MPDU or MMPDU.

6.1.6 No ACK RX

This section is applicable only when device set Bit 0 in QoSCapabilities field in GlobalCapability defined in section 7.2.1.

The device must be able to parse ACK policy subfield in the QoS header. If ACK policy subfield is set to No ACK, the device must not send 802.11 ACK frame upon receiving the MPDU or MMPDU.

6.1.7 Probe Request Handling

Host and device reply to probe request frames using the following guidance:
1. When the receiver address in probe request is an all-one broadcast address and device has started the IBSS beacon process, the device should reply the probe request with probe response, subject to the criteria defined in section 11.1.3.2 in the IEEE 802.11 specification. For example, one of the criteria is that the device shall not reply if it doesn't transmit beacon at the most recent TBTT. Device should indicate this probe request to the host regardless of whether it replies or not.
2. When the receiver address in probe request is not an all-one broadcast address, the device must not reply. Device should treat this probe request like normal 802.11 data and management frames. It should indicate it to the host if the packet passes address filtering test defined in section 6.1 in this specification.

6.1.8 Probe Response and Beacon Handling

When the received packet is an 802.11 probe response or beacon and device can find a matching BSSEntry in device's BSSTable, device shall determine if it should accept the Timestamp (the BSSTime) in the received packet. Please see section 11.1.1.1 and 11.1.1.2 in the IEEE 802.11 specification regarding to accepting timing information for infrastructure and IBSS network.

If device determines that it should accept the Timestamp in the receive packet, it should update *LastBssTime* and *LastLocalTime* field in the corresponding BSSEntry.

6.2 Packet Transmission

This section is applicable to both non-QoS and QoS capable devices although it is decribed in the context of QoS capable device. Obvious QoS specific descripton will not be highlighted. But they can be ignored for device that doesn't support QoS.

Device reports it supports QoS by setting Bit 0 QoSCapabilities field in GlobalCapability defined in section 7.2.1. For device that doesn't support QoS,

6.2.1 Mac Header Management

This section is not applicable for device sourced packet. It defines the ownership of 802.11 MAC header fields for host sourced packets. If a field is owned by host, its value will be provided by the host. If a field is owned by device, its value should be provided by device.

| Field Name | Host | Device |
|---|---|---|
| FrameControl.Version | √ | |
| FrameControl.Type | √ | |
| FrameControl.Subtype | √ (Except CF-Poll and CF-Ack bit) | √ (CF-Poll bit and CF-Ack bit only) |
| FrameControl.ToDS | √ | |
| FrameControl.FromDS | √ | |
| FrameControl.MoreFrag | √ | |
| FrameControl.Retry | | √ |
| FrameControl.PS | √ | |
| FrameControl.MoreData | √ | |
| FrameControl.Protected | √ | |
| FrameControl.Order | √ | |
| DurationID | | √ |
| Address1 | √ | |
| Address2 | √ | |
| Address3 | √ | |
| SC.FragNo | √ | |
| SC.SeqNo | √ | √ |
| Address4 | √ | |
| QoS | √ | |

Notes:
1. For non-null unicast QoS packets, host is responsible for filling SeqNo. Device must not source any such kind of packets because doing so can cause sequence number conflicts.
2. For all other types of packets, whenever applicable, device is responsible for filling SeqNo.

6.2.2 Transmission Queue

If device clears Bit 0 in QoSCapabilities field in GlobalCapability defined in section 7.2.1, device is required to support one out-of-BSS transmission queue (Q0) and one in-BSS transmission queues (Q1). Otherwise, it is required to support one out-of-BSS transmission queue (Q0) and 4 in-BSS transmission queues (Q1, Q2, Q3 and Q4). See section 8.1.4 for mapping transmission queues into USB endpoints.
- The priority order is Q0 > Q1 > Q2 > Q3 > Q4. Device must finish transmitting packets from high priority queue before it can transmit any packets from low priority queue.

- Transmission queue Q1 to Q4 can be suspended. When a transmission queue is suspended, transmission shall be stopped on that queue.
- CWmin, CWmax and AIFSN parameters are not associated with transmission queue. Host will supply CWmin, CWmax and AIFSN on a per-packet basis.

It is host responsibility to provide correct values for whole system to be compliant with 802.11 Specification. For example, the host will set AIFSN to 2 for non-QoS frame in order to set the DIFS correctly (DIFS = SIFS + 2 * SlotTime).
- Host is responsible for assigning packets to appropriate transmission queue. Device shall not look for AC (access category) in the QoS header and change the assignment.
- If there is sufficient space, transmission queue may hold multiple packets. Packets are always appended to the end of transmission queue.
- Transmission queue flow control is specific to the underlying bus technology. See section 8.1.5 for flow control in USB.
- The amount of memory resource assigned to each transmission queue is specific to device implementation. It must be large enough for
    - transmitting at least one full-sized MSDU or all the MPDUs belonging to the same MSDU
    - implementing the optional burst transmission
        See section 6.2.6 for burst transmission.

Note: device sourced packets must not reduce the transmission queue resource available to the host.

6.2.3 Encryption

The host is responsible for key look up. Pairwise key is stored in PeerEntry. If encryption is needed, host will set "Encryption Bit" in TxFlags field in the TxDescriptor (section 7.4).

- Pairwise key is stored in PeerEntry (section 7.8.1). When Address 1 is an individual address, the device shall perform encryption using pairwise key from the $i$-th PeerEntry in PeerTable.

Device doesn't have to set FrameControl.Protected bit to 1. Host already set it properly.
- Encryption group key is stored in BSSEntry (section 7.7.1). When Address 1 is a group address, the device shall perform encryption using group key from the $i$-th BssEntry in BSSTable.

Device doesn't have to set FrameControl.Protected bit to 1. Host already set it properly.

6.2.3.1  *WEP Encryption*

Host provides and initializes the WEP header. Device should retrieve the IV (Initialization Vector) value from the header.

Host provides uninitialized space for the 4 byte WEP ICV (Integrity Check Value). Device is required to update it with the result of WEP encryption.

6.2.3.2 *TKIP Encryption*

Host provides and initializes the TKIP header. Device should retrieve the IV (Initialization Vector) value from the header.

Host provides uninitialized space for the 4 byte TKIP ICV (Integrity Check Value). Device is required to update it with the result of TKIP encryption.

6.2.3.3 *CCMP Encryption*

Host provides and initializes the CCMP header. Device should retrieve the PN (Packet Number) value from the header.

Host provides uninitialized space for the 8 byte CCMP MIC (Message Integrity Code). Device is required to update it with the result of CCMP encryption.

6.2.4 Retransmission Management

Device shall perform retransmission for unicast packet if it doesn't receive the corresponding MAC layer Acknowledgment. For packets that require MAC layer acknowledgement, the host will clear the *No ACK* bit in TxFlags field in *TxDescriptor*.

802.11 ACK frame is the MAC layer acknowledgement for most frames. There are other types of MAC layer acknowledgement for certain other types of 802.11 frames. For example, 802.11 *BlockAck* frame is a valid acknowledgement to an 802.11 *BlockAckReq* frame; and a normal 802.11 data frame is a valid acknowledgement to an 802.11 *PsPoll* frame. The device will need to look into the *FrameControl* field in outgoing packet in order to determine the type of incoming 802.11 MAC layer acknowledgement which it should expect to receive.

*TxRates* array in TxDescriptor controls the data rate and the maximum number of retransmissions. *TxRates* contains 8 transmission data rates, one for each transmission attempt. *TxRates*[0] is the data rate for the first transmission and *TxRates*[1~7] are data rates for retransmissions. *TxRates* array is null terminated (data rate 0) when less than 8 (re)transmissions are needed. The device shall fail a transmission when it reaches the retransmission limit.

*CW* field in TxDescriptor specifies the contention window parameter that the device shall use in retransmission back-off.

6.2.5 Fragmentation

Fragmentation is done in host and is transparent to the device. Each fragment is described by one

*TxDescriptor*. Except for the last fragment, the host will set *Hold Medium* Bit in *TxFlags* field in the *TxDescriptor* (section 7.4). Host will assign the same *Sequence Number* to all fragments belonging to the same MSDU.

Device shall set *Duration* field in the MAC header according to the special rules described in section 9.2.5.6 in yjr IEEE 802.11 Specification. If device wants to know whether fragments are belonging to the same MSDU, it shall inspect *MoreFrag* bit in FrameControl. *Hold Medium* Bit in TxDescriptor is not reliable since it can be used in other situations wherever SIFS interval timing is needed.

6.2.6 Burst Transmission (Block ACK and No AC TX)

*Burst Transmission* is optional. Capability of burst transmission is reported in *MaxTxBurstSize* field in *RadioCapabilityEntry* (see section 7.2.2). *Burst Transmission* is used for implementing 802.11 *Block ACK* and 802.11 *No ACK* which are described in section 9.10 and 9.11 in the IEEE 802.11 specification. 802.11 *Block ACK* setup and teardown is transparent to the device.

Each packet in burst transmission is described by one *TxDescriptor*. In addition, the host will do the following:

1. For 802.11 BlockACK transmission, host will set either RTS Protection Bit or CTS Protection Bit in *TxFlags* on the first frame
2. Except for the last frame in the burst exchange,
    a. Set *No ACK* bit in *TxFlags*
    b. Set *Hold Medium* Bit in *TxFlags*
    c. *TxRates* array will contain only one rate
3. For 802.11 BlockACK transmission, the last frame will be an 802.11 *BlockAckReq* control frame.
    a. *No ACK* bit in *TxFlags* is clear.
        NoACK == 0 means that device shall retransmit if it doesn't receive an MAC level acknowledgement.
        For 802.11 *BlockAckReq*, both 802.11 BlockAck and 802.11 ACK are considered as acceptable MAC level acknowledgement.
    b. *Hold Medium* Bit in *TxFlags* is clear.
        This will let device to release the medium after it completes the transmission.
    c. *TxRates* array may contain more than one rate.
        The device shall retransmit the last frame if it can not receive
4. For 802.11 NoACK transmission, the last frame will be a normal 802.11 data or management frame.
    a. *No ACK* bit in *TxFlags* will be set.

b. *Hold Medium* Bit in *TxFlags* may or may not be set.

c. *TxRates* array contain only one rate
5. The host ensures that all packets in the same burst exchange are directed to the same receiver.
6. For 802.11 *BlockACK* TX, the host ensures that all the data frames are QoS frames.

The host will perform retransmissions for packets that are not acknowledged by 802.11 *BlockACK* frame.
7. The host ensures the burst mode exchange can be accomplished within the TXOP limit. Note: the TXOP limit may cross TBTT boundary. For EDCA, this is allowed by IEEE 802.11 Specification.

There must be one *TxStatus* for every frame transmitted in burst mode. The device may combine all *TxStatus* in one status response.

6.2.7 Protection (RTS or CTS-to-self)

When protection is needed, host will set *RTS Protection* bit or *CTS Protection* bit in *TxFlags*.

Subject to requirements defined in 9.13 in the IEEE 802.11 Specification, device shall transmit RTS and CTS frame using the highest *Basic Rate* that is less than or equal to *TxRates*[0] in the *TxDescriptor*. Here, the *Basic Rate Set* is the intersection of *BSS Basic Rate Set* and *DSSS/HRDSSS Madatory Rate Set*. When intersection is empty, the *BSS Basic Rate Set* shall be used. Device can find *BSS Basic Rate Set* from the corresponding *BSSEntry* in BSSTable (see section 7.7.1 for *BSSEntry* structure).

Device may retry RTS protection. For each retransmission, device shall find the highest *Basic Rate* that is less than or equal to TxRate[*i*] in the *TxDescirptor*, where *i* is the *i*-th retransmission.

After RTS completes, device shall transmit the subsequent data frame starting from data rate *TxRates*[0] (regardless of whether retransmission occurs in RTS state or not).

In case of burst transmission and fragmentation transmission, the TxRate in first *TxDescriptor* shall be used.

The device shall set the *Duration* field to cover the duration until the first packet with either *No ACK* bit == 0 or *Hold Medium* bit == 0. If the first packet has *No ACK* bit == 0, the duration must also include the time that is required for transmitting the MAC layer acknowledgement. FIGS. 10- 13 illustrate some of possible scenarios.

6.2.8 Transmission of Beacon and Probe Response

Host transmits 802.11 probe response and beacon frames just like any other 802.11 frames.

Device shall fill the *Timestamp* field value with the current TSF timer value plus a host supplied adjustment value. The adjustment value is passed to the device in TxDescriptor (section 7.4).

Note:

1. Host needs to supply the adjusted value since it may send probe response and beacon frames for the BSSs which device is not aware of. Therefore, device may not have *LastLocalTime* and *LastBssTime*, which are required for calculating the current BSS time.
2. To determine the frame type, device shall inspect the Type and Subtype field in Frame Control in the MAC header.
3. Host may send unsolicited probe response (transmit probe response without receiving a probe request).

6.3 Automatic Beacon Transmission

6.3.1 Automatic Beacon Transmission in IBSS

When host is operating in IBSS mode, host will program device to automatically transmit beacon at a specified interval. The request is sent to the device via StartIBSSBeacon request (section 7.6.1). When generating beacon packets, device shall follow the procedure defined in section 11.1.2.2 in the IEEE 802.11 specification.

6.3.2 Automatic Beacon Transmission in Infrastructure Network

When host is operating as an AP (access point) in infrastructure network, it will transmit beacon packet at a specified interval. The beacon packet is transmitted like a regular 802.11 management packet. Device is required to set the Timestamp field in the beacon packet (section 6.2.8).

Note: since the host will need to update TIM information element frequently, the benefit of offloading the beacon generation to device is dramatically reduced. Given that the typical sizes of beacon packets are around 50~300 bytes, there isn't big difference between transferring a full beacon and transferring a TIM information element for a serial link like USB bus.

7 Data Types

7.1 Basic Data Types

7.1.1 KeyMaterial

KeyMaterial is the data structure representing cipher key.

Table 1 Description of KeyMaterial data type

| Field | Type | Description |
| --- | --- | --- |
| Algorithm | uint8 | Indicate the cipher algorithm<br>0 – WEP<br>1 – TKIP<br>2 – AES<br>128~255 – IHV Specific value (can be used by IHV driver)<br>Other values – Reserved |
| Length | uint8 | Length of key.<br>For WEP algorithm, Length is either 5 or 13.<br>For TKIP, Length field always has a value of 8.<br>For AES, Length field always has a value of 16.<br>Other values are reserved. |
| Key | uint8[64] | The key material. |

7.1.2 DataRateIndex

Data rate index is represented as an 8 bit unsigned integer (uint8). It is an enumeration type, defined in Table 2 and Table 3. All the other data rate index values are reserved.

- If device supports 802.11b, it must support all the data rates in Table 2.
- If device supports 802.11g, it must support all the data rates in Table 2 and Table 3. ERP-PBCC and DSSS-OFDM modes are not implemented in this specification.
- If device supports 802.11a, it must support all the data rates in Table 3.

Table 2 Data Rate Index for CCK Data Rates

| DataRateIndex | Data Rate Value |
| --- | --- |

| 0 | 1 Mbps (CCK) |
| --- | --- |
| 1 | 2 Mbps (CCK) |
| 2 | 5.5 Mbps (CCK) |
| 3 | 11 Mbps (CCK) |

Table 3 Data Rate Index for OFDM Data Rates for both 802.11a and 802.11g

| DataRateIndex | Data Rate Value |
| --- | --- |
| 6 | 6 Mbps<br>3 Mbps for 10 MHz channel spacing (for 11a only)<br>1.5 Mbps for 5 MHz channel spacing (for 11a only) |
| 7 | 9 Mbps<br>4.5 Mbps for 10 MHz channel spacing (for 11a only)<br>2.25 Mbps for 5 MHz channel spacing (for 11a only) |
| 8 | 12 Mbps<br>6 Mbps for 10 MHz channel spacing (for 11a only)<br>3 Mbps for 5 MHz channel spacing (for 11a only) |
| 9 | 18 Mbps<br>9 Mbps for 10 MHz channel spacing (for 11a only)<br>4.5 Mbps for 5 MHz channel spacing (for 11a only) |
| 10 | 24 Mbps<br>12 Mbps for 10 MHz channel spacing (for 11a only)<br>6 Mbps for 5 MHz channel spacing (for 11a only) |
| 11 | 36 Mbps<br>18 Mbps for 10 MHz channel spacing (for 11a only)<br>9 Mbps for 5 MHz channel spacing (for 11a only) |
| 12 | 48 Mbps<br>24 Mbps for 10 MHz channel spacing (for 11a only)<br>12 Mbps for 5 MHz channel spacing (for 11a only) |
| 13 | 54 Mbps<br>27 Mbps for 10 MHz channel spacing (for 11a only)<br>13.5 Mbps for 5 MHz channel spacing (for 11a only) |

7.1.3 DataRateSet

DataRateSet is a 128-bit bitmask as defined below. When bit *i* is set, data rate index *i* is in the rate set. For example, an 802.11b device will set bit 0~3 and clear all the other bits in its supported data rate set.

| Field | Type | Description |
|---|---|---|
| Low | uint64 | Bit 0 ~ 63 |
| High | uint64 | Bit 64 ~ 127<br>Reserved. Must be always zero. |

7.1.4 BandChannel

BandChannel is 32 bit in width as defined following:

| B31 ... B16 | B15 ... B12 | B11 ... B0 |
|---|---|---|
| Band | Channel Spacing | Channel |

Band (bit 16~31)

For 2.4 Ghz band operation, this field is always zero.

For 5GHz band operation, this field specifies the channel starting frequency in 0.5MHz unit.

The following values are currently defined in Annex J in the IEEE 802.11-2007.

10000: Channel Start Frequency 5 GHz

9875: Channel Start Frequency 4.9375 GHz

9780: Channel Start Frequency 4.89 GHz

9700: Channel Start Frequency 4.85 GHz

8000: Channel Start Frequency 4 GHz

10005: Channel Start Frequency 5.0025 GHz

8005: Channel Start Frequency 4.0025 GHz

All other values are reserved.

Channel Spacing (bit 12 ~15)

0: 20 MHz Channel Spacing

1: 10 MHz Channel Spacing (for 5 GHz band only)

2: 5 MHz Channel Spacing (for 5 GHz band only)

3~15: Reserved

Channel (bit 0 ~ 11)

When Band field is 0, Channel field can have value ranging from 1~14. All other values are reserved. For channel 14, the channel center frequency shall be 2484 MHz. For channel 1~13, the channel center frequency is calculated as the following:

$$ChannelCenterFrequency = 2407 + Channel \times 5\,MHz$$

When Band field is not zero, Channel field can have value ranging from 1~255. All other values are reserved. The channel center frequency is calculated as the following:

$$ChannelCenterFrequency = Band \times 0.5\,MHz + Channel \times 5\,MHz$$

7.2 Capability

7.2.1 Global Capability

| Field | Type | Description |
|---|---|---|
| NumRadios | Uint8 | Reserved.<br>Must always be 1. |
| BssTableSize | uint8 | The size of BssTable. This value must be at least 1. |
| PeerTableSize | uint16 | The size of PeerTable. This value must be at least 32. |
| SupportedCiphers | uint32 | This is bit mask indicating supported packet encryption/decryption algorithms<br>Bit 0 – WEP Algorithm<br>    Setting this bit indicates that the device supports WEP encryption and decryption<br>Bit 1 – TKIP Algorithm<br>    Setting this bit indicates that the device supports TKIP encryption and decryption<br>Bit 2 – AES CCMP Algorithm<br>    Setting this bit indicates that the device supports AES CCMP encryption and decryption.<br>Other bits – Reserved<br>    Always zero |
| PermanentAddress | MacAddress | The permanent MAC address that is flashed in the device. |
| IBSSBeaconMaxSize | uint16 | Maximum size of IBSS Beacon Packet.<br>Device shall reserve at least 512 bytes for storing IBSS beacon packets.<br>See section 7.6 for usage of this field. |
| TxCapabilities | uint16 | Bit 0 – Transmission Rate Adaptation<br>    Setting this bit indicates that device implements transmission rate |

| | | |
|---|---|---|
| | | adaptation and will ignore the data rates in TxDescriptor (section 7.4).<br><br>Clearing this bit means that device relies on host system for providing the transmission data rate in TxDescriptor (section 7.4).<br><br>If this bit is set, Bit 1 must also be set.<br><br>Bit 1 – Retransmission Rate Adaptation<br>    Setting this bit indicates that device implements retransmission rate adaptation.<br><br>    Clearing this bit means that device relies on host system for providing the retransmission data rates in TxDescriptor (section 7.4).<br><br>Bit 2 – per-packet ACK capabilities<br>    Setting this bit indicates that device implements ACK status information in TxStatus upon transmission completion.<br>    Clearing this bit otherwise.<br>    If device implements ACK status information, it must be able to report the signal strength and received data rate of the 802.11 ACK frame. It can optionally report the noise floor of the 802.11 ACK frame.<br>    See section 7.5 for details.<br><br>Bit 3~15 – Reserved<br>    These bits must be always zero. |
| QoSCapabilities | uint16 | Bit 0 – QoS Supported<br>    Setting this bit indicates that device implements all the hardware features that are required for supporting basic |

| | | QoS functionalities. Below outlines the hardware requirements:<br>1. Ability of transmitting unicast packets without requiring the receiver to send 802.11 ACK<br>This is needed for implementing BlockACK and NoACK transmission policy.<br>2. Ability of recognizing the ACK policy bit in QoS header and doesn't reply 802.11 ACK when requested by the sender.<br>3. In addition to TX0 transmission queue, device should implement 4 transmission queues TX1~4.<br>4. if device implements duplicate packet detection, it must be able to detect duplicate packets on a per-TID per transmitter basis.<br><br>Bit 1~15 – Reserved<br>These bits must always be zero. |
|---|---|---|
| DefaultRegDomain | uint16 | The default regulatory domain. It is 2 byte long and is encoded in the same way as IEEE 802.11 standard MIB variable *dot11RegDomainsSupportedValue*. |
| NumOfSupportedRegDomains | uint16 | Number of regulatory domains which the device can support. |

7.2.2 RadioCapabilityEntry

There is one *RadioCapabilityEntry* for each independent radio.

| Field | Type | Description |
|---|---|---|
| PhyTypeMask | uint32 | Bit 0 – 802.11b<br>Setting this bit indicates that this radio supports 802.11 b.<br>Bit 1 – 802.11g<br>Setting this bit indicates that this radio |

|  |  | supports 802.11 g.<br>Bit 2 – 802.11a<br>    Setting this bit indicates that this radio supports 802.11 a.<br>Bit 3 ~ 31 – reserved. |
|---|---|---|
| MaxTxBurstSize | uint16 | The maximum total size of packets in a burst transmission supported by the device.<br>If device doesn't support burst transmission, it should set this field to zero.<br>See section 6.2.2 for transmission queue management and section 6.2.6 for burst transmission. |
| TxPowerLevel | uint16[8] | 8 levels of TX power (in mW).<br>Device should report TX power levels in descending order. It should always put 0 at the end of this array when it has less than 8 transmission power levels. |
| NumOfSupportedBandChannels | Uint16 | Number of supported band/channels |
| Reserved | uint16[4] | Must always be zero |

7.2.3 SupportedRegDomains

This table describes the regulatory domains supported by the radio. Each entry in the table is 2 byte long and is encoded in the same way as IEEE 802.11 standard MIB variable *dot11RegDomainsSupportedValue*.

7.2.4 SupportedBandChannels

This table describes the band, channel and channel spacing supported by the radio. Each entry in the table is type of BandChannel defined in section 7.1.4.

The actual channels that will be used are determined by the current regulatory domain. For example, a device may support channel 1~14 for 2.4 GHz operation. It supports FCC (0x10) and Japan (0x40) regulatory domains. When the current regulator domain is set to FCC, host will perform active scanning in only channel 1~11.

If device supports

7.3 RxDescriptor

*RxDescriptor* is a fixed size 32-byte structure passed from device to host. See section 6.1 for receiving operations and section 8.4.2 for NWF_USB_MSG_RX_PACKET.

| Field | Type | Description |
|---|---|---|
| RxFlags | Uint32 | Rx flags field.<br><br>Bit 0 – RxBuffer overflow bit.<br>Setting this bit indicates that at least one packet is dropped due into insufficient receive buffer before this packet is fully received.<br><br>Bit 1 – FCS Error Bit<br>Setting this bit indicates the packet is corrupted (fail to pass FCS check)<br><br>Bit 2 – Address 1 Matched Bit<br>Setting this bit indicates the packet has passed Address 1 test as defined in section 0 and reach ProcessRxAfterMatchingAddr1 (Error! Reference source not found. 7).<br><br>Bit 3 – Key Unavailable Bit<br>Setting this bit indicates that the decryption key is not available.<br>This bit must be always 0 for unencrypted packets.<br>Setting this bit implies bit 2 must also be set.<br><br>Bit 4 – Decryption Failure Bit<br>Setting this bit indicates decryption failure. When this bit is set, bit 2 must be 1 and bit 3 must be 0.<br><br>Bit 5 – Probe Replied Bit<br>Setting this bit indicates that device has already replied the probe request with an 802.11 probe response.<br>This bit shall be always 0 when the received packet is not an 802.11 probe request.<br>See section 6.1.7 for further information. |

| | | Bit 6 ~ 31 – reserved. |
|---|---|---|
| RxRate | int8 | The data rate index value for the data rate at which the packet is received. See Table 2 and Table 3 for the mapping data rate index and data rate value. |
| RSSI | int8 | Receive signal strength indicator. The valid range is (-128 dBm to 127 dBm). |
| NoiseFloor | int8 | Noise floor in dBm. The valid range is [-128, -1] dBm. If device can't measure noise floor, it should set this field to 0. This HCI specification allows the device to indicate noise floor on a per-packet basis. However, the frequency of noise floor measurement is specific to device implementation. Therefore, device may report same NoiseFloor value for several consecutive received packets. |
| Reserved | int8[13] | Reserved. Must always be 0. |
| BandChannel | BandChannel | Identify the channel on which this packet is received. |
| TSF | Uint64 | The local TSF timer value when the packet is received. |

Notes:

1. For USB device, immediately (without padding bytes) after the Rx descriptor is the packet data.
2. For encrypted packets If device successfully decrypts an encrypted packets, it must set RxFlags.Bit2 == 1 and RxFlags.Bit3 == 0 and RxFlags.Bit4 == 0. It must not reset FrameControl.Protected bit after decryption. The host relies on *Protected* bit for removing cipher header and cipher trailer.

If device doesn't have decryption key for an encrypted packets, it must set RxFlags.Bit3 == 1 and RxFlags.Bit4 == 0 to signal the host for performing the decryption.

7.4 TxDescriptor

*TxDescriptor* is a 32-byte fixed size structure passed from host to device. See section 6.1.7 for transmission operations and section 0 for NWF_USB_MSG_TX_PACKET.

| Field | Type | Description |
|---|---|---|
| TxFlags | Uint32 | Tx flags field. Bit 0 – Hold Medium Bit |

| | | When this bit is set, indicates that the device must immediately transmit the next packet without releasing the medium after it completes the transmission of this packet. Here, the current packet and the next packet are submitted to the device in one single request.<br><br>Bit 1 – No ACK Bit<br>When this bit is set, the transmission doesn't need ACK from the receiver(s). The host will set this bit when the receiver address is a group address or Block ACK is being used.<br><br>Bit 2 – Encryption bit.<br>Setting this bit indicates that the device must encrypt the packet using key from the BSSTable/PeerTable specified by BSSPeerIndex field.<br>Otherwise, the host must not attempt to encrypt the packet.<br>See section 6.2.3 for details about encryption.<br><br>Bit 3 – Preamble Bit<br>When this bit is set, long preamble should be used. Otherwise, short preamble is used.<br><br>Bit 4 – RTS Protection Bit<br>When this bit is set, RTS/CTS handshake shall be performed prior to the transmission of the packet.<br>The host will never set this bit if the receiver address is a group address.<br><br>Bit 5 – CTS Protection Bit<br>When this bit is set, CTS-to-self protection shall be used prior to the transmission of the packet.<br><br>Bit 6 – Out-of-BSS Bit<br>When this bit is set, this packet is an out-of-BSS packet. *BSSPeerIndex* field will not contain a valid value.<br><br>Bit 7~31 – reserved. |
|---|---|---|
| TxRates | uint8[8] | The data rate index value for each (re)-transmission. |

| | | TxRates[*i*] is the data rate index for the *i*-th transmission. TxRates array is terminated with 0xff when less than 8 data rates are provided. |
| --- | --- | --- |
| | | If *No ACK* bit in *TxFlags* is clear, the (re)transmission shall be stopped when the device receives an 802.11 ACK or *i* > 8 or TxRates[*i*]==0. For both *i*>8 and TxRates[*i*]==0, the transmission fails. |
| | | If *No ACK* bit in *TxFlags* is set, the device should transmit the packet using TxRates[0] (the first data rate). |
| | | For data rate index and data rate value mapping, see Table 2 and Table 3. |
| Reserved | uint8[8] | 8-bytes reserved. Must always be 0. |
| AIFSN/PwrLevel | uint8 | Bit 0~3: <br> 0 ~ 15 AIFSN value. <br> Bit 4~6 -- Transmission Power Level Bit <br> Value 0 ~ 7 corresponding to the transmission power level reported in 7.2.2. <br> Bit 7 -- Reserved |
| CW | uint8 | ECWmin and ECWmax that should be used for this packet. <br> Bit0~3 -- ECWmin <br> CWmin=2^ECWmin - 1 <br> Bit4~7 -- ECWmax <br> CWmax=2^ECWmax - 1 |
| BSSPeerIndex | uint16 | This field is invalid when "Out-of-BSS" bit is set in TxFlags. Otherwise, it contains the BSSTable and PeerTable index. <br> Bit 0 ~ 3 -- the index in BSSTable. See section 7.7 for the details about BSSTable. <br> Bit 4 ~ 15 -- the index in PeerTable. See section 7.8 for the details about PeerTable. |
| Reserved | uint64 | Always zero. |

7.5 TxStatus

*TxStatus* is a 32-byte fixed size structure passed from device to host. See section 6.1.7 for transmission operations and section 8.4.1 for NWF_USB_USG_TX_STATUS

| Field | Type | Description |
| --- | --- | --- |

| TxFlags | uint32 | Tx Status Flags<br><br>Bit 0 – Fail Bit<br>    Setting this bit indicates that the transmission fails. Otherwise, the transmission succeeds.<br>    Note: when "No Ack" bit in the corresponding TxDescriptor is clear, transmission shall always succeed.<br><br>Bit 1~31 – reserved. |
|---|---|---|
| Retries | uint8 | Bit 0~2 – Retry Count Bit<br>    N/A if *No ACK* bit in the corresponding *TxDescriptor* is clear.<br>    Otherwise, this field indicates the number of retransmissions.<br><br>Bit 3~5: RTS Retry Count Bit<br>    N/A if *No ACK* bit in the corresponding *TxDescriptor* is clear.<br>    Otherwise, this field indicates the number of RTS retransmissions. |
| TxRate | uint8 | This field is applicable only when device implements transmission or retransmission rate adaptation.<br>This field contains the data rate of the last (re)transmission which device performs on the packet. |
| ACKRxRate | int8 | The data rate index value for the data rate at which the 802.11 ACK is received. See Table 2 and Table 3 for the mapping data rate index and data rate value.<br>This status information is optional. It is applicable only when the packets require 802.11 ACK and the device implements per-packet ACK status indication. Device should set this field to zero if this field is not applicable.<br>For details on how device reports the capability of per-packet ACK status indication, see the definition of Bit 2 in TxCapabilities field in section 7.2.1. |
| ACKRSSI | int8 | Receive signal strength indicator of the 802.11 ACK. The valid range is (-128 dBm to 127 dBm).<br>This status information is optional. It is applicable only when the packets require 802.11 ACK and the device implements per-packet ACK status indication. Device should set this field to zero if this field is not applicable. |

| | | For details on how device reports the capability of per-packet ACK status indication, see the definition of Bit 2 in TxCapabilities field in section 7.2.1. |
|---|---|---|
| ACKNoiseFloor | int8 | Noise floor of the 802.11 ACK in dBm. The valid range is [-128, -1] dBm.<br>If device can't measure noise floor, it should set this field to 0.<br>If device doesn't support per-packet noise floor measurement, it should set this field to the noise floor value from its most recent measurement.<br>This status information is optional. It is applicable only when the packets require 802.11 ACK and the device implements per-packet ACK status indication.<br>For details on how device reports the capability of per-packet ACK status indication, see the definition of Bit 2 in TxCapabilities field in section 7.2.1. |
| Reserved | uint8[23] | Reserved padding bytes. |

7.6 Automatic IBSS Beacon Transmission

7.6.1 StartIBSSBeacon

This primitive starts the IBSS beacon generation in the current channel. The size of beacon packet doesn't exceed the IBSSBeaconMaxSize in GlobalCapability defined in section 7.2.1.

For USB device, the size of the beacon packet can be determined by subtracting the size of the fixed portion of following data structure from the USB message size.

| Field | Type | Description |
|---|---|---|
| Reserved | uint8 | This field is always zero. |
| BssIndex | uint8 | This is the index of the BssEntry (see section 7.7.1).<br>From the BssEntry, device can find detailed information about the BSS, such as BSSID and basic data rate. |
| BeaconInterval | Uint16 | Beacon Internval in TUs |
| TxRate | uint8 | The data rate at which the packet should be transmitted. |

| | | |
|---|---|---|
| PwrLevel | uint8 | The transmission power level of the beacon packet |
| BeaconPacket | Variable size | The beacon packet including the MAC header and beacon body. Device should update the Timestamp field with the current TSF whenever it transmits a beacon packet. |

7.6.2 StopIBSSBeacon

This primitive stops the IBSS beacon generation. It is host's responsibility to issue StopIBSSBeacon before switching to a different channel.

| Field | Type | Description |
|---|---|---|
| Reserved | uint8 | This field is always zero. |

7.7 BSS table

There is a global BSS table describing each BSS in which the device joins. BSS table is a fixed size array. Its size can't be changed once the host driver is loaded. The following pseudo code describe BSS table.

BssEntry BssTable[BssTableSize];

Host can modify BssEntry. It never reads BssEntry from the device. When BssEntry.BSSID is null (00:00:00:00:00:00), the corresponding BssEntry is empty. When device needs to look up BSS table, it must skip the empty entry.

At RX path, device will need to look up BSS table for the purpose of packet filtering and/or determining the basic rate (to transmit 802.11 ACK).

At TX path, BssEntry index is already part of request. Device doesn't have to look up the BSS table. It should use the BssEntry indicated by the index.

The device must support a BSS table with at least one BssEntry (BssTableSize == 1). BssTableSize > 1 is needed to support repeater AP and/or virtual WiFi functionalities.

If the device supports more than one BssEntry, it must also support per-BSS basic rate and synchronization with multiple IBSS networks.

When device supports only one BssEntry, host will not start or join more than one IBSS network. However, it may start or associate with multiple infrastructure networks. In this case, the Basic Rates field will contain the basic data rates common to all the BSS'es. The BSSID field in the BssEntry will be set to broadcast address (wildcard address). This will disable the TSF synchronization and BSSID data packet filtering in the device.

7.7.1 BssEntry

| Field | Type | Description |
|---|---|---|
| BSSID | MAC Address | BSSID.<br>When BSSID field is not a broadcast address (either unicast or multicast), it will be used as an filter for filtering 802.11 data packets (see section 6.1.1).<br><br>When BSSID is a unicast address, device can (not required) update its TSF timer upon receiving a probe response or beacon frames from the BSS. |
| GroupKey | KeyMaterial | Cipher key for encrypting broadcast/multicast packets transmitted to the BSS identified by BSSID field.<br>This field is N/A when BSSID field is a group address. |
| BasicRates | DataRateSet | When BSSID field is a unicast address, this field contains the basic data rates which are supported by all devices in the BSS.<br>When BSSID field is a broadcast group address, this field contains the default basic data rates – the basic rates to be used when a matching BssEntry can not be found.<br>When BSSID field is a non-broadcast group address, this field is N/A. |
| LocalTsf | uint64 | Local Tsf time from the RxDescriptor for the last received probe response or beacon frame.<br>This field is N/A when BSSID field is a group address. |
| BssTime | uint64 | The timestamp value in the last received probe response or beacon frame<br>This field is N/A when BSSID field is a group address. |

Notes:
1. BSSID field uniquely identified a BssEntry. When BSSID is null (00:00:00:00:00:00), it means BssEntry is empty.
2. All the BssEntry fields, including GroupKey, are read-able.
3. All the BssEntry fields are write-able. Host always set the whole BssEntry.

a. When BSSID is changed from a non-null value into null, it is a BssEntry deleting operation. It is up to device implementation to implement deleting specific operation.

b. When BSSID is changed from into a non-null value, it is a BssEntry creating operation. It is up to device implementation to implement creating specific operation.

c. When BSSID is not null and is not changed by a BssEntry setting request, it is a BssEntry updating operation.

4. For an BssEntry updating operation, a. If it is important for the device to know which field is updated, the device can find it out by comparing the updating request with the values stored in the device.

b. The device can assume that the BasicRates field will not be updated (the value in the request is same as the one stored in the device).

c. GroupKey can be changed even when the device has broadcast/multicast packets in its TX queue that require access to the GroupKey. The device should ensure atomicity at packet level: each packet in the TX queue must be encrypted either by the old key or by the new key. It is ok that some are encrypted with the old key and some are encrypted with the new key.

d. After GroupKey is updated, all the subsequent broadcast/multicast packets submitted from the host must be encrypted with the new key.

7.8 Peer Table

There is a global peer table describing each peer which the device associates with. Here, the peer can be an 802.11 ad hoc peer station or an infrastructure AP. Peer table is a fixed size array. Its size can't be changed once the host driver is loaded. The following pseudo code describe BSS table.

PeerEntry PeerTable[PeerTableSize];

Host can modify PeerEntry. It never reads PeerEntry from the device. When PeerEntry.PeerMac is null (00:00:00:00:00:00), the corresponding PeerEntry is empty. When device needs to look up peer table, it must skip the empty entry.

At RX path, device will need to look up peer table for the purpose of packet decryption, etc.

At TX path, PeerEntry index is already part of request. Device doesn't have to look up the peer table. It should use the PeerEntry indicated by the index.

7.8.1 PeerEntry

Table 4 Description of PeerEntry data type

| Field | Type | Description |
| --- | --- | --- |
| PeerMac | MAC Address | Peer's MAC address. When it is null, the PeerEntry is empty. Otherwise, it contains the MAC address of the peer and must be a unicast address. |
| BSSID | MAC Address | Peer's BSSID. This field must contain a unicast address for a non-empty PeerEntry. |
| DataRate | DataRateSet | Data rates which are supported by this peer. This field is provided so that the device can choose proper data rates for rate adaptation. |
| PairwiseKey | KeyMaterial | Cipher key for encrypting or decrypting unicast packets. |
| GroupKey | KeyMaterial | Cipher key for decrypting broadcast/multicast packets transmitted from peer in network identified by BSSID field. |

Notes:
3. PeerMac and BSSID uniquely identify a PeerEntry
4. All the PeerEntry fields, including PairwiseKey and GroupKey, are read-able.
5. All the BssEntry fields are write-able. Host always set the whole BssEntry.
    a. When PeerMac is changed from a non-null value into null, it is a PeerEntry deleting operation. It is up to device implementation to implement deleting specific operation.
    b. When PeerMac is changed from into a non-null value, it is a PeerEntry creating operation. It is up to device implementation to implement creating specific operation.
    c. When PeerMac is not null and is not changed by a PeerEntry setting request, it is a PeerEntry updating operation.
6. For an BssEntry updating operation,
    a. If it is important for the device to know which field is updated, the device can find it out by comparing the updating request with the values stored in the device.
    b. PairwiseKey can be changed even when the device has directed packets in its TX queue that require encryption. The device should ensure atomicity at packet level: each packet in the TX queue must be encrypted either by the old key or by the new key. It is ok that some are encrypted with the old key and some are encrypted with the new key.

c. After PairwiseKey is updated, all the subsequent directed packets submitted from the host must be encrypted with the new key.

d. After GroupKey is updated, all the subsequent broadcasted/multicasted packets received from the peer must be decrypted with the new key. Packets already in the Rx buffer at the time when GroupKey is updated must be decrypted with the old key.

7.9 Other Primitives

7.9.1 GlobalState (W)

GlobalState contains relatively stable information. Items that may change frequently, such as RadioPowerState and CurrentChannel, have their own dedicated primitives.

| Field | Type | Description |
|---|---|---|
| PacketFilter | uint32 | Bit 0 – FilterDiscardCorruptedFrame<br>If this bit is set, device should discard all frames that fail to pass FCS verification and should not indicate them to host.<br>Otherwise, device should indicate corrupted frames to host (if device is capable of receiving them).<br>Bit 1 – FilterDiscardDuplicateFrame<br>If this bit is set and device implements duplicate frame detection, device should discard duplicate frames.<br>Otherwise, device should not drop duplicate frames (but it can still drop that frame at later time if there are other applicable filters).<br>Bit 2 – FilterDiscardAddress1MismatchedFrame<br>If this bit is set, device should discard directed frame in which the Address 1 field doesn't match device's current MAC address.<br>Otherwise, device should indicate the frames to host. |

| | | |
|---|---|---|
| | | Bit 3 – FilterDiscardControlFrame<br>If this bit is set, device should discard 802.11 control frames except PS-Poll, BlockACKReq and BlockACK frames.<br>Otherwise, device should indicate the frames to host.<br>Bit 4 – FilterDiscardBSSIDMismatchedFrame<br>This bit is applicable to 802.11 data frames only.<br>If this bit is set, device should discard 802.11 data frames with a BSSID that can not be found in the BSSTable.<br>Otherwise, device should indicate the frames to host.<br>Bit 5~31 – Reserved<br>Must always be zero. |
| CurrentRegDomain | Uint16 | The current regulatory domain. The default value must be DefaultRegDomain in GlobalCapability as defined in section 7.2.1. |

7.9.2 RadioPowerState (W)

| Field | Type | Description |
|---|---|---|
| RadioPowerState | Uint8 | Bit 0 ~ 1 – Radio Power State Bit<br>0 - radio is turned off<br>1 – radio is in doze state (power off for power saving purpose)<br>2 - reserved<br>3 - radio is turned on<br>Bit 2~7 – Reserved<br>Must be always 0.<br>Switching between "doze" and "on" state shouldn't take more than 1 millisecond. |
| Reserved | Uint8[3] | Reserved. Must be always 0. |

7.9.3 CurrentChannel (W)

| Field | Type | Description |
|---|---|---|
| BandChannel | BandChannel | See section 7.1.4 for BandChannel data type. After device powers up, it may stay in any band or channel. |
| TxPowerIndex | Uint8 | The default transmission power level for the new channel. This value is actually an index into TxPowerLevel table which the device reports in GlobalCapability as defined in section 7.2.1. |
| TxQueueFlags | uint8 | Bit 0 – In-BSS queue enabled<br>    Setting this bit will enable (or resume) the packet transmission from the in-BSS queue in the new channel.<br>    Clearing this bit will disable (or suspend) the packet transmission from the in-BSS queue in the new channel.<br>Bit 1~7 – Reserved<br>    Must always be zero. |

7.9.4 FlushTxQueue (W)

| Field | Type | Description |
|---|---|---|
| TxQueue | uint8 | Bit 0 – Q1<br>    When this bit is set, all packets queued in Q1 are immediately discarded.<br>Bit 1 – Q2<br>    When this bit is set, all packets queued in Q2 are immediately discarded.<br>Bit 2 – Q3<br>    When this bit is set, all packets queued in Q3 are immediately discarded.<br>Bit 3 – Q4<br>    When this bit is set, all packets queued in Q4 are immediately discarded. |

| | | Bit 4~7 – Reserved |
| | | These bits must always be zero. |
| | | After device powers up, Q1~Q4 must be empty. |
| Reserved | uint8[3] | Reserved. Must be always 0. |

8 USB Message Definition

A USB wireless LAN device is a high speed USB device (low speed and full speed configurations may not be supported). It is implemented as a USB CDC (Communication Device Class) device with two interfaces. A Communication Class interface of type Abstract Control, and a Data Class interface combine to form a single functional unit representing the USB wireless LAN device.

The Communication Class interface includes a single endpoint for event notification and uses the shared bidirectional Control endpoint for control messages. The Data Class interface includes two bulk endpoints for data traffic.

8.1 USB Descriptors

8.1.1 Device Descriptor

Native 802.11 USB device is vendor specific class (protocol field is set to 0xff) USB CDC device. It uses the standard USB CDC device descriptor.

Native 802.11 USB device should support Microsoft OS Descriptor (MOD), through which the operating system can form the Native 802.11 device identification string (PnP ID). The compatible ID in the Microsoft OS Configuration Descriptor should be "WLAN\x00\x00\0x00\x00". The sub-compatible ID should be zero. This will cause the OS PnP manager to create compatible device ID "USB\MS_COMP_WLAN", which will select the OS USB WLAN class driver when there is no IHV specific driver.

8.1.2 Configuration Descriptor

Native 802.11 USB device uses the standard USB CDC configuration descriptor.

8.1.3 Communication Class Interface

This interface contains only one endpoint for device notification. The endpoint descriptor is a standard USB Interrupt-type IN endpoint whose *wMaxPacketSize* field is 8 bytes.

| Offset (bytes) | Field | Size (bytes) | Value | Description |
|---|---|---|---|---|
| 5 | bInterfaceClass | 1 | 0x02 | Communication Interface Class code |
| 6 | bInterfaceSubClass | 1 | 0xff | Vendor Specific SubClass |
| 7 | bInerfaceProtocol | 1 | 0xff | CDC protocol code for vendor specific protocol. |

8.1.4 Data Class Interface

The Data Class interface is described by a standard USB Interface Descriptor followed by 3 endpoint descriptors: 2 Bulk-OUT and 1 Bulk-IN endpoint. The maximum packet size is 1024 bytes for high speed configuration. Full speed configuration may not be supported.

The first Bulk-OUT endpoint is used for transferring control messages and packets transmitted over the out-of-BSS queue Q0. The $2^{nd}$ Bulk-OUT endpoint is used for transferring packets transmitted from the four in-BSS transmission queues Q1~Q4. See section 6.2.2 for definitions of transmission queues Q0~Q5. The following notations are used for representing the Bulk-OUT endpoints Bulk-OUT(0)    The first Bulk-OUT endpoint Bulk-OUT(1)    Then $2^{nd}$ Bulk-OUT endpoint Bulk-OUT(*)    Any Bulk-OUT endpoint The Bulk-IN endpoint is for indicating packets to the host. There is only one end Bulk-IN endpoint.

8.1.5 Flow Control

Transmission Queue Flow control is achieved via the standard USB flow control mechanism as defined in section 8.5.1 in the USB 2.0 Specification.

8.2 USB Message on Default Endpoints

8.2.1 Device Capabilities

Host queries various 802.11 capabilities from the device by setting bRequest to 1 in USB Setup transaction.

| bmRequestType | bRequest | wValue | wIndex | wLength |
|---|---|---|---|---|
| 0xA0<br>Direction: Device to host<br>Type: Class<br>Recipient: device | 1 | Specify the type of capabilities | | |

8.2.1.1 Global Capabilities

Host queries global capabilities using the following USB setup transaction. In the data transaction, the device should return its global capabilities as defined in section 7.2.1.

| bmRequestType | bRequest | wValue | wIndex | wLength |
|---|---|---|---|---|
| 0xA0 | 1 | 1 | 0 | Size of "Global Capability" structure defined in section 7.2.1. |

8.2.1.2 Radio Capabilities

Host queries radio capabilities using the following USB setup transaction. In the data transaction, the device should return its radio capabilities for the requested radio.

| bmRequestType | bRequest | wValue | wIndex | wLength |
|---|---|---|---|---|
| 0xA0 | 1 | 2 | 0 | Size of "Radio Capability" structure defined in section 7.2.2. |

8.2.1.3 Regulatory Domain Capabilities

Host queries supported regulatory domains using the following USB setup transaction. In the data transaction, the device should return an array of supported regulatory domains. Each regulatory domain entry is 2 byte in length and has the same definition as the IEEE standard MIB dot11RegDomainsSupportedValue.

Device's behavior is unspecified if *wLength* is smaller than the required size. Host calculates the size based on *NumOfSupportedRegDomains* which device returns in the radio capabilities structure.

| bmRequestType | bRequest | wValue | wIndex | wLength |
|---|---|---|---|---|
| 0xA0 | 1 | 3 | 0 | Size of the regulatory domain table. |

8.2.1.4 Supported Band and Channels

Host queries supported band and channels using the following USB setup transaction. In the data transaction, the device should return an array of supported band/channels. Each entry is type of BandChannel structure defined in section 7.1.4.

Device's behavior is unspecified if *wLength* is smaller than the required size. Host calculates the size based on *NumOfSupportedChannels* which device returns in the radio capabilities structure.

| bmRequestType | bRequest | wValue | wIndex | wLength |
|---|---|---|---|---|
| 0xA0 | 1 | 4 | 0 | Size of the BandChannel table. |

8.3 USB Message on Bulk-OUT Endpoints

Native WiFi Bulk-OUT messages always start with the following header. In this revision, host will not concatenate multiple smaller USB messages. Therefore, every native WiFi Bulk-OUT message requires at least one USB write transfer. When the message size exceeds the maximum USB packet size (1024 bytes), it will be split.

Table 5 Native WiFi Bulk-OUT USB Message Header

| Offset (bytes) | Field | Size (bytes) | Description |
|---|---|---|---|
| 0 | Type | 4 | Any suitable message type code may be used. |
| 4 | Length | 4 | Length of message (excluding Type and Length field). |
| 8 | Message | Length | Message data itself |

Most control messages are sent to devices over the Bulk-Out(0) endpoint (instead of the default endpoint). This is needed for ensure proper synchronization with activities in the air. For example, switching channel and setting cipher keys must be serialized with packet transmissions.

The following messages are defined for Bulk-Out endpoints

Table 6 Native WiFi USB Message on Bulk-OUT Endpoints

| Code | Name | Description | Transfer Type |
|---|---|---|---|
| 2 | NWF_USB_MSG_TX_PACKET | Message for packet transmission | Bulk-Out(*) |
| 5 | NWF_USB_MSG_SWITCH_CHANNEL | Switch Band/Channel | Bulk-Out(0) |

| 6 | NWF_USB_MSG_GLOBAL_STATE | Turn on/off radio | Bulk-Out(0) |
| 7 | NWF_USB_MSG_RADIO_POWER_STATE | Turn on/off radio or set radio into doze state. | Bulk-Out(0) |
| 8 | NWF_USB_MSG_FLUSH_TX | Flush TX queues | Bulk-Out(0) |
| 9 | NWF_USB_MSG_BSS_ENTRY | Set BssEntry | Bulk-Out(0) |
| 10 | NWF_USB_MSG_PEER_ENTRY | Set PeerEntry | Bulk-Out(0) |

8.3.1 NWF_USB_MSG_TX_PACKET

NWF_USB_MSG_TX_PACKET is transferred over one of the 5 Bulk-OUT endpoints, representing the 5 transmission queues defined in section 6.2.2. The message body for NWF_USG_MSG_TX_PACKET is as following:

Table 7 NWF_USB_MSG_TX_PACKET

| Offset (bytes) | Field | Size (bytes) | Description |
|---|---|---|---|
| 0 | TxId | 4 | The transmission identifier. When TxId is zero, host doesn't care the transmission status. It considers the transmission as completed as soon as the USB write transfer completes. When TxId is non-zero, device shall report the TX status via *NWF_USB_MSG_TX_STATUS*. It shall copy the TxID value into the corresponding *NWF_USB_MSG_TX_STATUS*. The host uses this field to correlate *NWF_USB_MSG_TX_PACKET* with *NWF_USB_MSG_TX_STATUS*. |
| 4 | TxDescriptor | 32 | See section 7.4 for TxDescriptor structure. |
| 36 | Packet Data | variable | The packet data including MAC header, packet body and FCS field. FCS field is initialized to 0xffffffff. Size of packet data can be determined by subtracting packet data offset from the total message length. |

8.3.2 NWF_USB_MSG_BAND_CHANNEL

Table 8 NWF_USB_MSG_BAND_CHANNEL

| Offset (bytes) | Field | Size (bytes) | Description |
|---|---|---|---|
| 0 | BandChannel | 2 | See section 7.1.4 for BandChannel data type. |

8.3.3 NWF_USB_MSG_RADIO_POWER

Table 9 NWF_USB_MSG_RADIO_POWER

| Offset (bytes) | Field | Size (bytes) | Description |
|---|---|---|---|
| 0 | RadioPowerState | 4 | See section 7.9.1 for RadioPowerState data type. |

8.3.4 NWF_USB_MSG_FLUSH_TX

Table 10 NWF_USB_MSG_TX_SUSPENSION_STATE

| Offset (bytes) | Field | Size (bytes) | Description |
|---|---|---|---|
| 0 | FlushTxQueue | 4 | See section 7.9.4 for FlushTxQueue data type. |

8.3.5 NWF_USB_MSG_BSS_ENTRY

Table 11 NWF_USB_MSG_BSS_ENTRY Set Request

| Offset (bytes) | Field | Size (bytes) | Description |
|---|---|---|---|
| 0 | Index | 4 | The index of the BssEntry in the BssTable. |
| 4 | BssEntry | | See section 7.7.1 for BssEntry data type. |

8.3.6 NWF_USB_MSG_PEER_ENTRY

Table 12 NWF_USB_MSG_BSS_ENTRY Set Request

| Offset (bytes) | Field | Size (bytes) | Description |
|---|---|---|---|
| 0 | Index | 4 | The index of the PeerEntry in the PeerTable. |
| 4 | PeerEntry | | See section 7.8.1 for PeerEntry data type. |

8.4 USB Message on Bulk-IN Endpoint

Native WiFi Bulk-IN messages always start with the following header. The header format is same as the one used in Bulk-OUT messages.

Table 13 Native WiFi Bulk-IN USB Message Header

| Offset (bytes) | Field | Size (bytes) | Description |
|---|---|---|---|
| 0 | Type | 4 | Any suitable message type code may be used. |
| 4 | Length | 4 | Length of message (excluding Type and Length field). The length doesn't include padding bytes which may be added in multi-message transfer. |
| 8 | Body | Length | Message data itself |

Multiple smaller USB messages may be concatenated and sent in one single USB transfer. *Type* field of each message is always aligned to 4-byte boundary. Therefore, padding bytes may be added to USB messages except the last one. *Length* of message doesn't include the padding bytes. Padding bytes can be uninitialized.

The following messages are defined on Bulk-IN endpoint.

Table 14 Native WiFi USB Message on Bulk-IN Endpoints

| Code | Name | Description |
|---|---|---|
| 3 | NWF_USB_MSG_TX_STATUS | Message for packet transmission completion |
| 4 | NWF_USB_MSG_RX_PACKET | Message for packet indication |

8.4.1 NWF_USB_MSG_TX_STATUS

NWF_USB_MSG_TX_STATUS is transferred over the Bulk-IN endpoint.

Table 15 NWF_USB_MSG_TX_STATUS

| Offset (bytes) | Field | Size (bytes) | Description |
|---|---|---|---|
| 0 | TxId | 4 | The transmission identifier. The device shall set this field with the *TxId* from the corresponding NWF_USB_MSG_TX_PACKET. |
| 4 | TxStatus | 32 | See section 7.5 for TxStatus structure. |

8.4.2 NWF_USB_MSG_RX_PACKET

NWF_USB_MSG_RX_PACKET is transferred over the Bulk-IN endpoint.

Table 16 NWF_USB_MSG_RX_PACKET

| Offset (bytes) | Field | Size (bytes) | Description |
|---|---|---|---|
| 0 | RxDescriptor | 32 | See section 0 for RxDescriptor structure. |
| 32 | Packet Data | variable | The packet data including MAC header, packet body and FCS field. Size of packet data can be determined by subtracting packet data offset from the total message length. |

8.5 Functionalities Requirements

8.5.1 Basic Requirement

8.5.1.1 Supported WiFi Functionalities

The operating system will provide a WiFi USB class driver that implements basic 802.11 functionalities:

- Infrastructure station supporting: Open/No Encryption, Open/WEP, Open/1X WEP, WPA-PSK/TKIP, WPA-PSK/AES, WPA/TKIP, WPA/AES, WPA2-PSK/TKIP, WPA2/TKIP, and WPA2/AES
- IBSS station supporting "No Encryption", WEP and WPA2-PSK/AES.

- Infrastructure Access Point
- All the above three will support subset of WMM and 802.11e The basic 802.11 functionalities doesn't support

- Multi-BSS joining
- 802.11 power management
- Wake on Wireless LAN
- Performance Enhancement, such as hardware accelerated encryption and decryption.

8.5.1.2 Device Requirement

In order to meet the basic requirements, device must implement the following:

- Channel Switching as defined in section 7.9.2
- All transmission functionalities as defined in section 6.2, 7.4 and 7.5 except the following:
    - Fragmentation transmission
    - Packet Encryption
    - Report the timestamp at which a packet is transmitted
- All reception functionalities as defined in section 6.1 and 7.3 except the following:
    - Packet Decryption
- Automatic Beacon Generation:
    - Device doesn't have to support more than one beacon per beacon group
    - Device doesn't have to support beacon *TxInterval* with a value greater than 1. Therefore, device can contend for IBSS beacon transmission at each TBTT.

8.5.1.3 Driver Installation

The OS supplied WiFi USB class driver will use a compatible device identification string derived from Microsoft OS descriptor. The operating system supplied WiFi USB class driver can be replaced with a signed IHV driver, if one available. IHV supplied driver must use device identification string in the form of USB\VID_*v(4)*&PID_*d(4)*&REV_*r(4)*.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method performed on a computing device, the method comprising: exchanging information via a hardware control interface ("HCI") between a hardware network adapter and a driver software module that corresponds to the hardware network adapter, where the hardware control interface is configured for operating with a variety of different hardware network adapters of different types, where the different hardware network adapters include the hardware network adapter, and where the hardware control interface is network adapter independent.

2. The method of claim 1 where the hardware control interface is configured for supporting at least a portion of a wireless communication standard.

3. The method of claim 1 where the hardware control interface comprises:
    a transmission control interface;
    a transmission status interface;
    a reception control interface; or
    a channel switching interface.

4. The method of claim 1 where the driver software module comprises the hardware control interface.

5. The method of claim 4 where the driver software module controls the hardware network adapter according to at least a portion of a wireless communication standard.

6. The method of claim 5 where the wireless communication standard comprises at least one 802.11 standard.

7. The method of claim 1 where the hardware control interface is implemented at least in part in software.

8. At least one computer storage media storing computer-executable instructions that, based on execution by a computing device, configure the computing device to perform actions comprising: exchanging information via a hardware control interface ("HCI") between a hardware network adapter and a driver software module that corresponds to the hardware network adapter, where the hardware control interface is configured for operating with a variety of different hardware network adapters of different types, where the different hardware network adapters include the hardware network adapter, and where the hardware control interface is network adapter independent.

9. The at least one computer storage media of claim 8 where the hardware control interface is configured for supporting at least a portion of a wireless communication standard.

10. The at least one computer storage media of claim 8 where the hardware control interface comprises:
    a transmission control interface;
    a transmission status interface;
    a reception control interface; or
    a channel switching interface.

11. The at least one computer storage media of claim 8 where the driver software module comprises the hardware control interface.

12. The at least one computer storage media of claim 11 where the driver software module controls the hardware network adapter according to at least a portion of a wireless communication standard.

13. The at least one computer storage media of claim 12 where the wireless communication standard comprises at least one 802.11 standard.

14. The at least one computer storage media of claim 8 where the hardware control interface is implemented at least in part in software.

15. A computing device comprising:
    at least one processor;
    memory coupled to the at least one processor;
    a hardware network adapter coupled to the at least one processor and the memory;
    a hardware control interface ("HCI") via which the computing device exchanges information between the hardware network adapter and a driver software module that corresponds to the hardware network adapter, where the hardware control interface is configured for operating with a variety of different hardware network adapters of different types, where the different hardware network adapters include the hardware network adapter, and where the hardware control interface is network adapter independent.

16. The computing device of claim 15 where the hardware control interface is configured for supporting at least a portion of a wireless communication standard.

17. The computing device of claim 15 where the hardware control interface comprises:
    a transmission control interface;
    a transmission status interface;
    a reception control interface; or
    a channel switching interface.

18. The computing device of claim 15 where the driver software module comprises the hardware control interface that is implemented at least in part in software.

19. The computing device of claim 18 where the driver software module controls the hardware network adapter according to at least a portion of a wireless communication standard.

20. The computing device of claim 19 where the wireless communication standard comprises at least one 802.11 standard.

* * * * *